United States Patent

[11] 3,629,846

[72] Inventor John Stewart Thompson
Sea Bright, N.J.

[21] Appl. No. 45,296
[22] Filed June 11, 1970
[45] Patented Dec. 21, 1971

[73] Assignee Bell Telephone Laboratories, Incorporated
Murray Hill, Berkeley Heights, N.J.

[54] TIME-VERSUS-LOCATION PATHFINDER FOR A TIME DIVISION SWITCH
26 Claims, 14 Drawing Figs.

[52] U.S. Cl. .......... 340/172.5, 179/15
[51] Int. Cl. .......... H04q 11/04, H04b 3/00
[50] Field of Search .......... 340/172.5; 179/15, 18

[56] References Cited

UNITED STATES PATENTS

| | | | |
|---|---|---|---|
| 2,957,949 | 10/1960 | James et al. .................. | 179/18 |
| 3,217,106 | 9/1965 | Muroga et al................. | 179/15 |
| 3,379,836 | 4/1968 | Brightman et al. ........... | 178/50 |
| 3,399,387 | 8/1968 | Kunze .......................... | 340/172.5 |
| 3,441,908 | 4/1969 | Mizzi............................ | 340/172.5 |
| 3,446,917 | 5/1969 | Inose et al..................... | 179/15 |
| 3,461,242 | 8/1969 | Inose et al..................... | 179/15 |
| 3,462,743 | 8/1969 | Milewski....................... | 340/172.5 |
| 3,492,435 | 1/1970 | Inose et al..................... | 179/18 |
| 3,496,301 | 2/1970 | Kaenel .......................... | 179/15 |
| 3,533,080 | 10/1970 | Minarcik....................... | 340/172.5 |

*Primary Examiner*—Raulfe B. Zache
*Assistant Examiner*—Jan E. Rhoads
*Attorneys*—R. J. Guenther and Kenneth B. Hamlin

ABSTRACT: Storage access to multiple storage locations is coordinated for the time slots of successive frames of a time slot interchange operation in a time division multiplex system by registering location access control signal changes, identifying first and second time slots of interest, and then identifying a transmission path in the form of a time-location sequence of uniform location availability status between such time slots in the time-storage domain of the locations. Time coordinates of the termini of the sequence are registered for use by the system's control logic to determine one or more locations of the sequence and to store appropriate information in control memories supplying the access control signals. Pathfinding embodiments are shown for time slot interchangers using as storage the locations of a reentrant shift register, a random access memory, or a delay line.

INVENTOR
J. S. THOMPSON
BY
Charles Scott Phelan
ATTORNEY

TIME-VERSUS-LOCATION PATHFINDER FOR A TIME DIVISION SWITCH

CROSS-REFERENCE TO OTHER APPLICATIONS

This application claims subject matter first disclosed in my copending application (J. S. Thompson Case 1) Ser. No. 40,882 filed May 27, 1970, entitled "Time Division Switching System."

BACKGROUND OF THE INVENTION

1. Field of the Invention

This invention relates to time division multiplex systems, and it relates particularly to logic arrangements for facilitating time slot interchange operation of time division switches.

2. Prior Art

The time slot interchange technique is known in the art for switching time division multiplex pulse trains without demodulating those trains to analog signals and without demultiplexing them to respective message pulse trains. Pathfinding logic for time slot interchange operations determines an available sequence of equipment for establishing a connection between calling and called equipments and registers identification of equipment-branching point devices for that connection in appropriate control memories which are subjected to readout scanning in the time slot sequence of respective frames of time division multiplex signal transmission. At the beginning of a call, a central control apparatus can readily determine through known supervisory signaling arrangements, the identification of the calling line and time slot and the identification of the called line.

It has been the practice in certain prior art time slot interchange applications to provide a sufficient number of full-frame pulse shifters to yield a desired blocking probability. For example, in the H. Inose, et. al. U.S. Pat. No. 3,446,917, the number of pulse shifters provided was approximately twice the number of line concentrators served by the control center for a completely nonblocking operation. The pathfinding logic in such a system searches the input junctor cross-point control memory to locate a cross-point which is available in a common time slot with the calling line. If the preferred calling time slot is not free on an input junctor cross-point, the system shifts to a second preferred calling time slot and repeats the search operation. The same procedure is repeated until a common available time slot is found. A similar multisearch operation is conducted to find an output junctor cross-point which has a common available time slot with the time division line served by the called party.

Upon determination of all of the necessary time slot and equipment information for the talking path of a call, the control center goes through similar operations to establish a listening path for the same call in different phases of the same time slots. However, the listening path of the call connection utilizes those time slots in complementary order with the result that the total roundtrip delay is always equal to one full frame of time division multiplex signal transmission.

Time slot interchange pathfinding operations of the type just described wherein a search is conducted for a time division frame unit of delay storage access require a great deal of pulse shifter hardware for time slot delay storage. Furthermore, the pathfinding logic is complex because it requires repeated search attempts with different temporarily dedicated time slot information until a set of equipment is found which can accommodate a particular pair of time slots for the complete talking-listening loop for a call connection. Each search repetition requires extra operating time as well as imposing an uncertainty as to the total amount of time that will be required to establish any call connections.

A further difficulty of prior art time slot interchange pathfinding logic operations is that they are not conveniently useful for a system wherein each time division multiplex line can be connected to any time slot unit storage location in every time slot. The reason that this problem exists is that once information is entered at a full-frame, pulse-shifting, delay, storage unit, it is extracted within a frame because the junctor cross-points allow access to only frame units of storage and not to time slot units of storage.

It is, therefore, one object of the present invention to find a time slot interchange connection path by an algorithm that operates rapidly and is not highly dependent upon trial and error techniques with their necessary time requirement uncertainties.

An additional object is to make it possible to reduce time slot interchanger hardware requirements.

It is another object to determine time slot delay storage status and time slot availability substantially concurrently so that the two sets of information may be promptly utilized together once they have been determined.

A further object is to determine time slot unit storage status information for use in conjunction with time slot names identified as being of interest for defining a time slot interchange connection path.

STATEMENT OF THE INVENTION

Solution of the foregoing problems and attainment of the mentioned objects are realized in an illustrative embodiment of the invention wherein storage location access control signals for multiple storage locations are utilized with timing signal information to identify a time-location sequence of predetermined location availability status in the time-storage domain of such locations.

In a time slot interchange time division switch, output time slot identification is made independently of input time slot identification and of time slot interchange storage location status identification. However, the output time slot and the storage status determinations are substantially concurrently accomplished so that they may be utilized directly for gaining access to the equipment then indicated to have the desired status. Such access may be for either establishing or taking down time slot interchange connections.

It is one feature of the invention that separate status and compare ranks of signal storage equipment, each having a storage capacity which is similar to the capacity of all of the first-mentioned multiple storage locations, are utilized to register changes in storage location status and to indicate a predetermined current status of storage capacity availability for time slot interchange connection.

It is another feature that for disconnecting time slot interchange connections, time slot information is utilized for identifying storage locations employed in the time slot interchange connection and for thereafter taking down the latter connection.

BRIEF DESCRIPTION OF THE DRAWING

A more complete understanding of the present invention and its various features, objects and advantages may be obtained from the following detailed description and the appended claims when taken together with the attached drawings in which:

DETAILED DESCRIPTION

Figure 1:
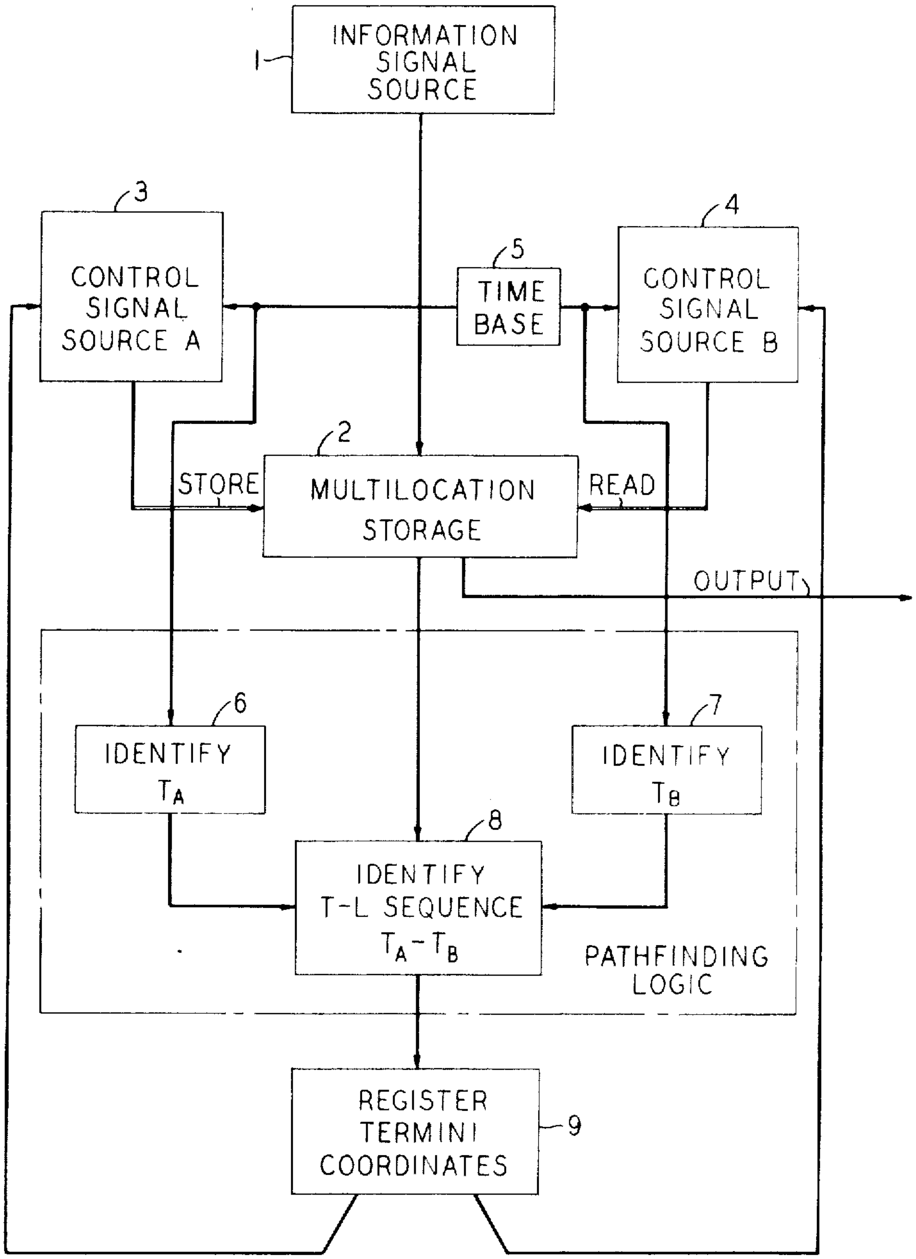
FIG. 1 is a functional block and line diagram of a pathfinding system in accordance with the present invention.

FIG. 1 is a simplified functional diagram of a system utilizing the present invention. It is hereinafter described and further illustrated in relation to a time division multiplex signal transmission system employing time slot interchange switching for establishing communication between two stations, e.g., two telephone subscribers in a greatly simplified illustrative application of the invention.

An information message signal source 1 represents schematically a plurality of calling subscribers. The source 1 is coupled through multilocation time slot delay storage 2 for time slot interchange coupling to called subscribers or lines which are schematically represented by an output connection. The storage of message signal information in multilocation storage 2 and the reading of such information are accomplished under the control of control signal sources 3 and 4, which are otherwise designated sources A and B, respectively. These control signal sources schematically represent groups of separate control memories provided for input and output time division lines, respectively. Such control memories are scanned in the time slot sequence of recurrent frames of time division multiplex signal transmission to determine which input or output time division line should be connected to any particular delay storage location in each time slot. Coordination of the control signal sources and the other functions depicted in FIG. 1 is exercised by a central control which is not shown, but which is schematically represented in part by a time base signal source 5. The latter source provides various types of time base signals to the sources 3 and 4 and to identifying logic circuits 6 and 7 in the pathfinding logic for the system.

The pathfinding logic just mentioned utilizes the logic circuits 6 and 7 to identify two time slots of interest; namely, the time slots of the calling and called parties in a time division multiplex system. A further set of identifying logic 8 receives both the time slot information from circuits 6 and 7 and the access control signal information supplied through the multilocation storage 2 for identifying a time-location sequence in the time-storage domain of delay storage 2. That sequence is one which has a predetermined storage status during and between the two time slots that have been identified. If a time slot interchange connection is to be established, the predetermined status which is sought is delay storage capacity which is uniformly available for signal storage during and between the two time slots. If a time slot interchange connection is to be disconnected, the predetermined status which is sought is delay storage capacity that is occupied uniformly throughout the sequence with a time slot unit segment of a given message.

Circuits 9 register time slot and location names which have just been identified as coordinates of the termini of the time-location sequence. The names so registered are utilized to influence the operation of control signal sources 3 and 4. Thus, if a call connection is being established, the storage location names are stored in input and output line control memories, respectively, at the input time slot word location and output time slot word location thereof, respectively. If a call connection is being taken down all-ZERO words are stored in such word locations.

It is the pathfinding logic function to which the present invention is directed. Details of the several illustrative embodiments of the invention in time slot interchange switching systems are disclosed in my copending application entitled "-Time Division Switching System." Those embodiments are illustrated particularly in FIGS. 1 through 3, 6 through 9 and 11A through 13B of that application and descriptions thereof appear at pages 4–13, 24–37 and 40–56 of that application. Those figures and descriptive materials are reproduced herein, but the description is modified here slightly to accommodate the disclosure environment of the present invention.

Figure 2:
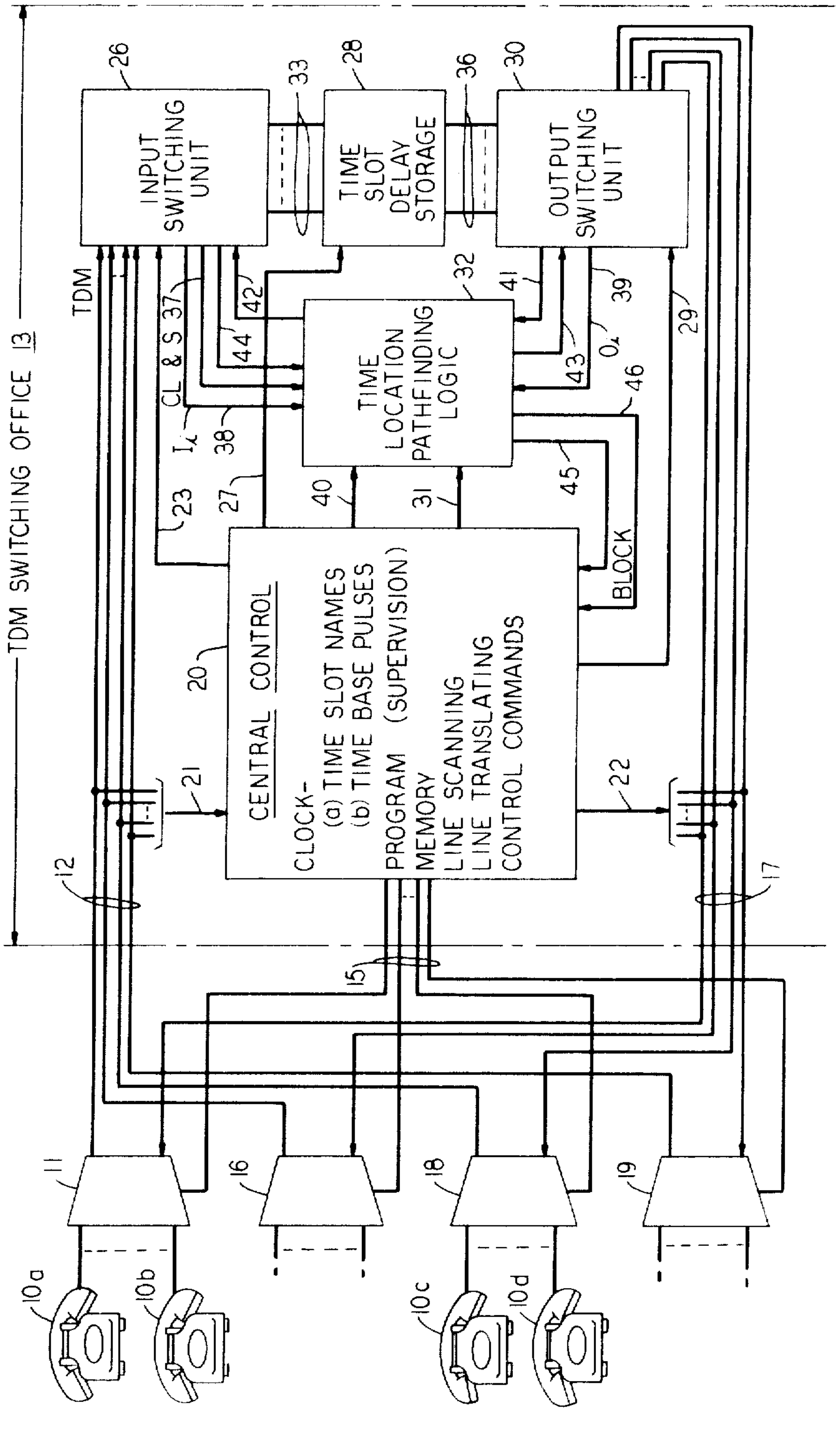
FIG. 2 is a simplified block and line diagram of a time division multiplex switching system utilizing pathfinding logic of the present invention.

FIG. 2 is a simplified time division multiplex switching system utilizing the present invention. The system is operated for selectively interconnecting a plurality of subscribers such as telephone subscribers 10*a*, 10*b*, 10*c*, and 10*d*. Line concentrators 11, 16, 18, and 19 sample message signals from respective groups of subscribers, e.g., 10*a* and 10*b* for concentrator 11 and 10*c* and 10*d* for concentrator 18. For convenience of illustration only four subscribers on two of four concentrators are shown, but operation with many more concentrators and subscribers per concentrator can be achieved with the present invention. Those analog samples in a concentrator are advantageously translated to a pulse code modulated form and applied on a time division multiplex basis to an individual, transmitting, space-divided channel such as one of the time division lines 12 for the respective concentrators. The latter lines couple the time division message signals to a time division multiplex switching office 13. The lines 12 are hereinafter considered to be input time division lines for office 13. A further group of lines 17 comprise receiving time division lines for concentrators 11, 16, 18, and 19, respectively; and are hereinafter considered output lines for office 13. Any of the aforementioned time division lines may instead of serving a line concentrator as shown, serve as time division multiplex links to other equipment such as different time slot interchangers or different switching offices in a manner which will be subsequently briefly discussed for plural time slot interchangers.

Each line concentrator is advantageously of a type somewhat modified from concentrators heretofore often used in the art in that each transmitting subscriber served by a concentrator has a specific preassigned time slot for transmitting but can receive during any time slot dictated by the office 13. Control from office 13 is exercised by way of control lines 15 in a manner known in the art.

It is sufficient for purposes of teaching the present invention to deal primarily with a single direction of transmission, it being understood that similar techniques are used to establish circuits for transmission in the opposite direction between the same calling and called parties. In the system depicted in FIG. 2 the equipment in office 13 detects the input line and time slot numbers used by a party seeking to make a call, finds a free time slot for transmission on the output line to the called party desired, and establishes a time slot interchange connection between those lines. This establishes the talking, or transmitting, path from calling party to called party. Next the office identifies the transmitting time slot of the called party and establishes a listening time slot interchange path back to the calling party.

Within office 13 a central control 20 is provided for automatically managing the operation of the office 13. Such management is usually exercised in accordance with data processing techniques now well known in the art and wherein the central control 20 is a stored program controlled processor. A few of the central control functions will be mentioned. Thus, the central control applies, for its own use and for use throughout the office, clock signals in the form of time base pulses, some recurring at the time slot rate and others at the same or other rates in different phase relations. Other clock signals are provided in the form of recurring trains of binary-coded time slot name words occurring at a word repetition rate which is equal to the time slot recurrence rate for the system and named according to the numerical sequence of each time slot in a frame. Time base pulses occurring at the time slot rate and phase are hereinafter called "time slot pulses." Time base pulses occurring in different phases are called "time slot phase pulses;" and they are indicated by a reference character TSØ__where the blank designates the particular phase. Thus, TSØA is a time slot phase A. Time slot name trains are called "time slot clock." Central control 20 also includes memory facilities for permanent program storage as well as for the storage of temporary and permanent data and temporary instruction information. Sequencing circuits are also included in the central control 20 for producing the necessary control commands to various office units in response to the decoding of programmed instructions.

One of the functions included in central control 20 is a line-scanning function for supervisory purposes, and to this end a connection 21 is provided from input time division highways 12 to the central control 20. A further connection 22 to output time division highways 17 supplies control signals in a dedicated time slot to remote concentrators. This function is performed in cooperation with the similar function of the dedicated control lines 15. The extent to which either technique, or both techniques, are employed depends upon design convenience in the particular system application. Details of the scanning, and related supervisory functions of securing, storing, and using individual subscriber-related information are not here presented because they are well known for time division switching systems and are not necessary to an understanding of the present invention.

Outputs from central control 20 include signals provided on a connection 23 for controlling an input switching unit 26, signals on a connection 27 for controlling time slot delay storage 28, signals on a connection 29 for controlling an output switching unit 30, and signals on a connection 31 for controlling time-location pathfinding logic 32. Units 26 and 30 cooperate with storage 28 for interconnecting time division lines by time slot interchange techniques. Time slot delay storage 28 includes plural time slot unit storage locations to which the input switching unit 26 supplies time slot units of message signal at appropriate time slots. During each time slot each of the individual storage locations in the delay storage 28 can be connected to receive time slot unit signals from any incoming time division line 12 by way of input circuits 33. Similarly, output circuits 36 receive appropriately delayed message signals from individual storage locations in delay storage 28 and are connected to individual output time division lines 17 by the output switching unit 30. A time slot unit of message signal can be a single binary code bit representation or a group of such bits depending upon system organization as is known in the art. However, in the present application the discussion is presented in terms of a time slot unit of message signal which includes only a single binary code bit.

The delay storage 28 includes far less storage locations than are normally found in time division switching systems of the prior art since those locations are individually available during each time slot to each input and output time division line. Consequently, pathfinding logic 32 is included in the office 13 for indicating, in a manner which will be subsequently described, the availability of various storage locations in delay storage 28 in respective time slots that are of interest for the establishment of new connections between calling and called subscribers and their respective time division multiplex lines in calling and called time slots, respectively, available on those lines. For convenience of description, this type of pathfinding logic operation is generally indicated as finding in the time-storage domain for delay storage 28 a time-location sequence which is available for establishing new connections without overwriting, or being overwritten by, other message signals applied to storage 28.

Each of the switching units 26 and 30 includes circuits, to be subsequently discussed, for coupling the time division lines to any of the locations of storage 28. The particular coupling relationships usually differ in each time slot of a frame, but the same coupling between line and storage is employed repeatedly in successive frames for any particular message. A necessary sequence of connections for a line is stored in a control memory, to be discussed, for such line. Connection information stored is advantageously a location name in storage 28, and the name is decoded when read out to provide a control signal on an appropriate circuit for controlling the connection and for advising pathfinding logic 32 of the action.

Operation of pathfinding logic 32 is initiated by a clear and start signal on a circuit 37 from the input switching unit 26. Thereafter operation is continued in response to input control signals $I_t$ supplied on a cable 38 from the unit 26 and output control signals $O_t$ supplied on a cable 39 from the output switching unit 30. Clock signals of different types are also received from central control 20 on a circuit 40. Control memory outputs from the memories directly or from their decoder circuits are provided by way of circuits 41 and 44 from the switching units to the logic 32. Upon completion of a pathfinding operation, the logic 32 supplies appropriate time slot and storage location information to switching units 26 and 30 by way of circuits 42 and 43, respectively. However, if a blocking condition is found which indicates insufficient delay storage equipment availability at appropriate times, a blocking signal is supplied on a circuit 46 to the central control 20 for initiating appropriate supervisory signaling action with respect to the calling party. In a similar manner, signals on a circuit 45 inform central control of the completion of different pathfinding steps, e.g., output line time slot blockage, so further action can be initiated.

Figure 3:
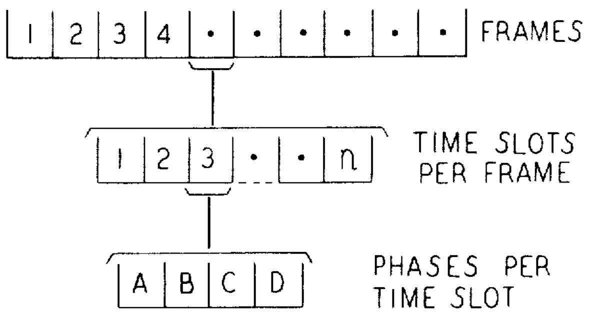
FIGS. 3 and 4 are time-related diagrams presented to facilitate an understanding of the operation of the invention.

FIG. 3 depicts briefly several time relationships which are understood in the art for time division multiplex systems. Thus, at the top of the figure are represented plural frames of message signal transmission, and in any given system a predetermined number of frames per second are transmitted on each time division line. Each frame is subdivided into $n$ time slots during which a time slot unit of message signal from a line is transmitted. A time slot pulse or a time slot clock word persists for substantially a full-time slot. Each time slot is further subdivided into a plurality of phases during which different control operations take place in the office 13. In FIG. 3 a time slot such as the time slot 3 is shown as being subdivided into four phases A through D, respectively, which are the phases utilized in a reentrant shift register embodiment of the invention which will be described. The same sequence of phases recurs during each time slot just as the same sequence of $n$ time slots recurs during each frame.

When it is determined that a subscriber is seeking to establish a new connection, the office 13 performs the necessary connect search operation separately from but simultaneously with, the time slot interchanging functions for previously established connections during the successive time slots and frames of signal transmission. However, only one connect search operation or one disconnect search operation is carried out at any given time. Accordingly, once a time slot or a hardware unit is identified for use in setting up a particular call, its availability status is retained for that particular search operation until a complete path through the office 13 is determined. Upon the completion of such a determination appropriate entries are made in the control memories of the switching units 26 and 30 to establish the time division multiplex connection through the office 13. This control write operation is carried out without interrupting normal time slot interchange operations by writing into control memories during time slot phases when such memories are not otherwise being read out or written.

Figure 4:
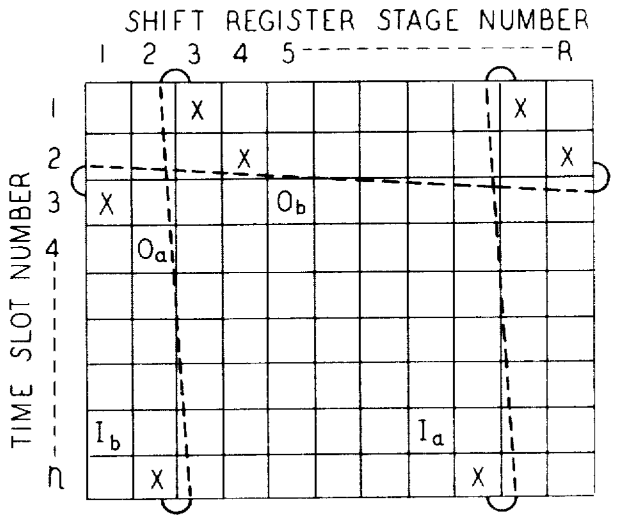

Before proceeding to a discussion of details of particular portions of the system of FIG. 2 which are different from what one finds in the prior art, it is convenient to consider in connection with FIG. 4 a simplified representation of the time-storage domain which has been heretofore mentioned. The representation of FIG. 4 is applicable to a shift register embodiment, which will be hereinafter described, and includes rows and columns of blocks which are identified by different register stage numbers along a particular row and different time slot numbers along a particular column. Thus by scanning down a column of the diagram in FIG. 4 it can be seen immediately in which of $n$ time slots during a frame the register stage corresponding to that column is in use. Similarly it can be seen by scanning along a row which of R stages of the register are in use during a particular time slot.

In FIG. 4 time slot delays for two particular calls are indicated in the diagram. An "I" indicates the input point to the time-location sequence employed for the call and an "O" indicates the output terminal point of the sequence. Intervening points are indicated by X's in the appropriate blocks of the diagram. For example, one sequence $I_a$–$O_a$ begins in stage R-3 at time slot *n*-1. In the last time slot *n* of one frame, the message information bit resides in state R-2; and in the first time slot of the succeeding frame the bit is found in stage R-1. In time slot 2 of the latter frame, the bit resides in stage R of the register; and for time slot 3 the bit is recirculated to the first stage of the register. This same sequence ends with the bit resting in stage 2 of the register during time slot 4. A second sequence $I_b$–$O_b$ is also shown in the diagram and begins in stage 1 during one frame and terminates in stage 5 during time slot 3 of the next succeeding frame.

All of the blocks in FIG. 4 which include no characters indicating a time slot delay sequence are available for use in additional sequences. A plurality of such sequences can be independently carried out during any one frame and even during any one time slot, since the availability of delay storage locations is not restricted to a common input connection or a common output connection. For example, it can be seen in FIG. 4 that both of the illustrative sequences just described start in different stages of the shift register during the same time slot *n*-1. These sequences continue independently of one another, but simultaneously, in different regions of the register. The two sequences overlap in the first and second stages of the register but during different pairs of time slots so there is no overwriting or other interference with message signal information being delayed during the two sequences.

The aforementioned pathfinding logic 32 makes it possible to find an appropriate available sequence in the delay storage 28 once any particular pair of calling and called time slots have been identified. When such a sequence has been determined, it is used for time slot delay storage with complete assurance that there will be no danger of new information overwriting old information to the detriment of either set of message information. Likewise much less delay storage hardware is required to stand idle in anticipation of a possibility of the occurrence of a need for a long time slot delay on some time division line. The arrangement of the invention is made possible by the fact which is known in the time division multiplex switching art that for typical traffic loading the time slot delay required for the average call is comparatively short in relation to the total number of time slots in a frame. In FIG. 4 the two examples shown required time slot delays of six and five time slots, respectively, in a system using a minimum delay strategy, to be discussed, and with an offered traffic level of about 0.5 erlang per time slot on a time division line. Such delays are longer than is usually required on the average in such a system.

In one example of a time division system of the type illustrated in FIG. 2, the design included M input lines and M output lines where M was equal to four. The reentrant shift register utilized for the delay storage 28 included R stages wherein R was equal to 2M, i.e., 8. This arrangement provided a blocking probability of about 5 percent with an offered traffic loading of about 0.5 erlang per time slot on a line. That blocking probability and loading are approximately the maximum generally employed in the art for telephone and data transmission systems. A lower blocking probability can be realized by extending the size of the shift register to 3M stages to make a total of 12, which is less than the number of time slots per frame utilized by most designers skilled in the art for time division multiplex systems. However, the most advantageous number of stages, i.e., storage locations, for delay storage 28 using a minimum delay strategy, to be described, for pathfinding is experimentally determined in terms of the number of lines, and to some extent the number of time slots, as well as the desired blocking probability and traffic loading per channel for a particular application. For other pathfinding strategies the number of time slots must be considered to a greater extent.

Figure 5:
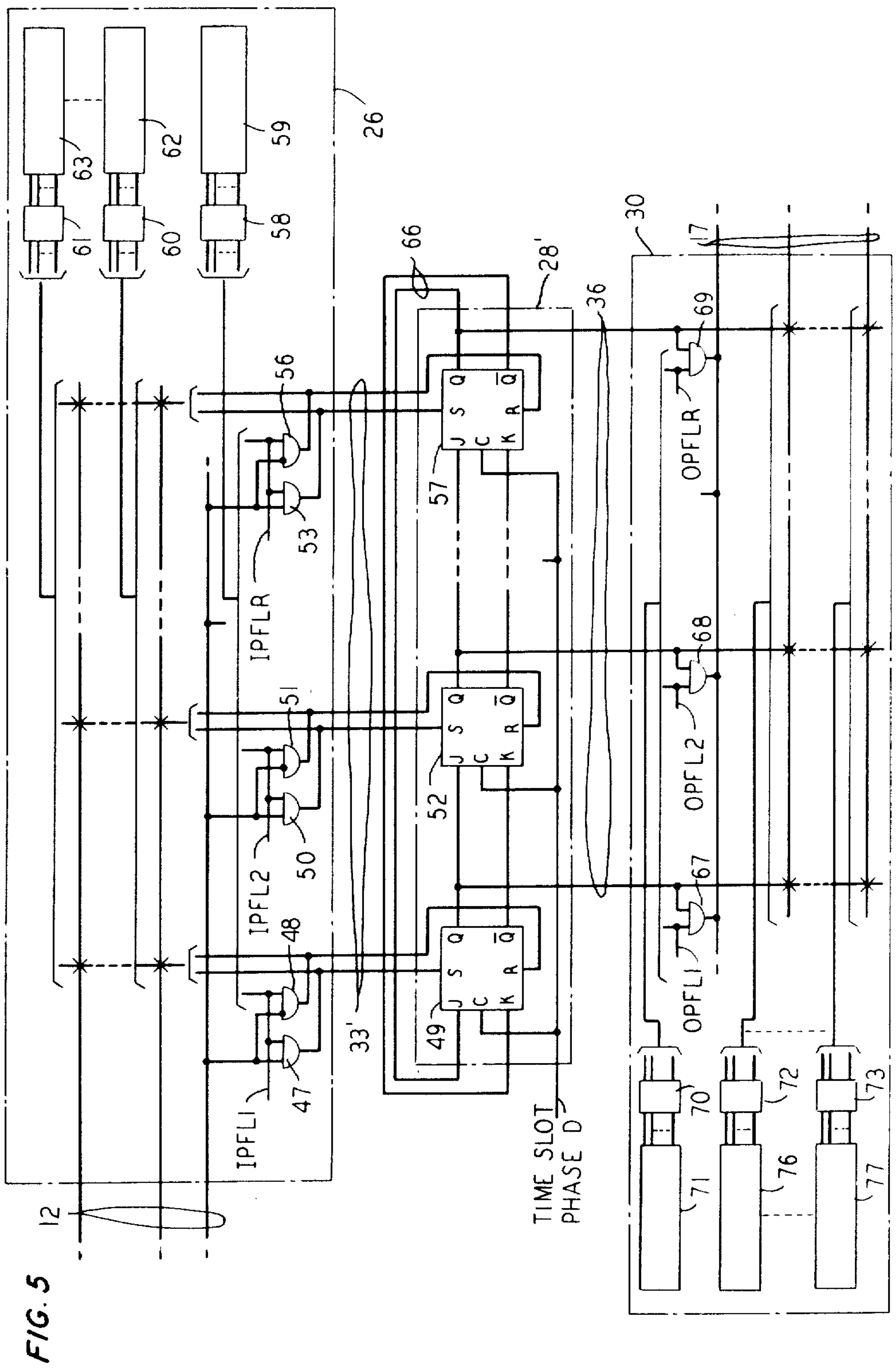
FIG. 5 illustrates one form of delay storage that is useful in the system of FIG. 2.

FIG. 5 illustrates additional detail of the switching units 26 and 30 and the delay storage 28 for an embodiment of the invention wherein a reentrant shift register 28' is utilized for such delay storage. The switching unit 26 includes a space division switching matrix wherein the row circuits are the input time division lines 12 and the column circuits are the coupling circuits 33, in double-rail form, which are utilized to control the states of individual bistable circuit stages of shift register 28'.

Each matrix cross-point in unit 26 includes a pair of coincidence gates as indicated for the bottom row of the matrix in FIG. 5. Thus, a pair of gates 47 and 48 are utilized to convert single-rail time division signals appearing on the bottom rail of the matrix into double-rail signals for application to a bistable circuit 49, which is the first, or lowest order, stage of register 28'. For this purpose the gate 47 receives at one input the true form of signals on that rail circuit while the gate 48 receives in complement form at one of its input connections the same signals. Coincidence gates and complement, or inhibit, input connections of the type indicated are well known in a variety of suitable forms to those skilled in the art. A similar pair of gates 50 and 51 couple the same rail signals to a bistable circuit 52 in the second stage of shift register 28', and gates 53 and 56 couple those signals to inputs of a bistable circuit 57 which is in the Rth, or highest order, stage of register 28'. Each of the aforementioned pairs of cross-point gates is individually addressable for the application of enabling signals by a 1-out-of-R type of output signal from a decoder 58 which converts to that form the binary coded register stage name output information received from a control memory 59. Various forms of memory and decoder suitable to this purpose are known in the art and details thereof are not here presented. However, associated logic circuits for interfacing the decoder and memory with the rest of the system are considered in greater detail in my aforementioned copending application. Cross-point gates and controls therefor for other cross-points of the switching matrix in switching unit 26 are of the same type as those already described and are thus indicated schematically by an X at each cross-point in the remainder of the matrix illustrated. Cross-points for the two remaining matrix rails that are indicated are controlled respectively by decoders 60 and 61 associated with control memories 62 and 63.

The bistable circuits in the various stages of shift register 28' are advantageously of the type sometimes designated J-K flip-flops. Signals applied at the J and K inputs of the flip-flop circuit control the state of that circuit if that state should be different at the time of application at the C input of a clock signal, in this case the time slot phase D signal which is applied in multiple to all stages of the shift register. However, additional set and reset input connections are provided to each flip-flop circuit from the previously described space division switching matrix and are to force the flip-flop circuit to the bistable condition indicated by time division message signals from the matrix without the occurrence of the clock control signal input to the flip-flop circuit. Each stage of the register 28 has its Q, or binary ONE, output connected to the J input of the succeeding stage and its $\bar{Q}$, or binary ZERO, output connected to the K input of the succeeding stage. Output connections of the Rth stage 57 are looped around by connections 66 for similar control of the input stage 49 to form a reentrant shift register.

Q output connections of the respective stages of shift register 28' are applied by the coupling circuits 36 to the respective column rails of another space division switching matrix in output switching unit 30. The row rails of this latter matrix are the output time division multiplex lines 17, and a single coincidence gate is provided at each matrix cross-point. Illustrative gates 67, 68, and 69 are shown for the cross-points connected to the uppermost rail of the matrix in FIG. 5. Each of these gates has one input connection from a corresponding associated column rail of the matrix, and they all have their single output connections to the upper row rail of the matrix. The gates are individually enabled for operation by control signals supplied from a decoder 70 which is operated by an output control memory 71. As in the case of the input switching unit 26, additional matrix cross-points are indicated by Xs in the output switching unit 30 and the two additional rows of such cross-points are controlled respectively by decoders 72 and 73 and control memories 76 and 77. When one of the cross-point gates is enabled it couples a time division multiplex time slot unit message signal from its associated matrix column circuit to the time division output line 17 which is connected to such gate. In the embodiment of FIG. 5 the input and output control memories include word storage locations corresponding to each time slot of a time division multiplex frame. Stored in those word locations for control memories of input and output lines are binary coded names of appropriate stages, for time slot interchange coupling, of the register 28' corresponding to column rails of the input and output space division switching matrices. Time base signals from central control 20 simultaneously scan the control memories at the time slot rate. Consequently, the readout of a particular word location in a corresponding time slot is converted to a 1-out-of-R format by the associated control memory decoder and applied to the indicated matrix cross-point gate. Thus, each input line 12 has access in phase A of every time slot to every stage of the register 28', and the particular stage used at any time slot is governed by the corresponding control memory word. However, multiple simultaneous access to any single stage is prevented by the storage of appropriate stage names in the control memories under the influence of the pathfinding logic 32 as will be further described in greater detail. Access for output lines is similarly provided in phase C of every time slot.

It will also be seen in FIG. 5 that branching connections are provided at the cross-point gate enabling input leads which are controlled by control memory decoder outputs. These branching connections are designated IPFL__in the input switching unit 26 and extend to the path finding logic 32 for a purpose which will subsequently be described. The blank in the lead reference character will contain the numerical designation of the corresponding stage of the register 28'. Thus, the IPFL2 lead extends the cross-point gate control signal from the gates 50 and 51 of the second stage to the pathfinding logic 32. Similar control circuit extensions are provided from the inputs to all of the cross-point gates in the input space division switching matrix. In like manner control circuit extensions are also provided in the matrix of the output switching unit 30 and are similarly designated OPFL__.

Figure 6:
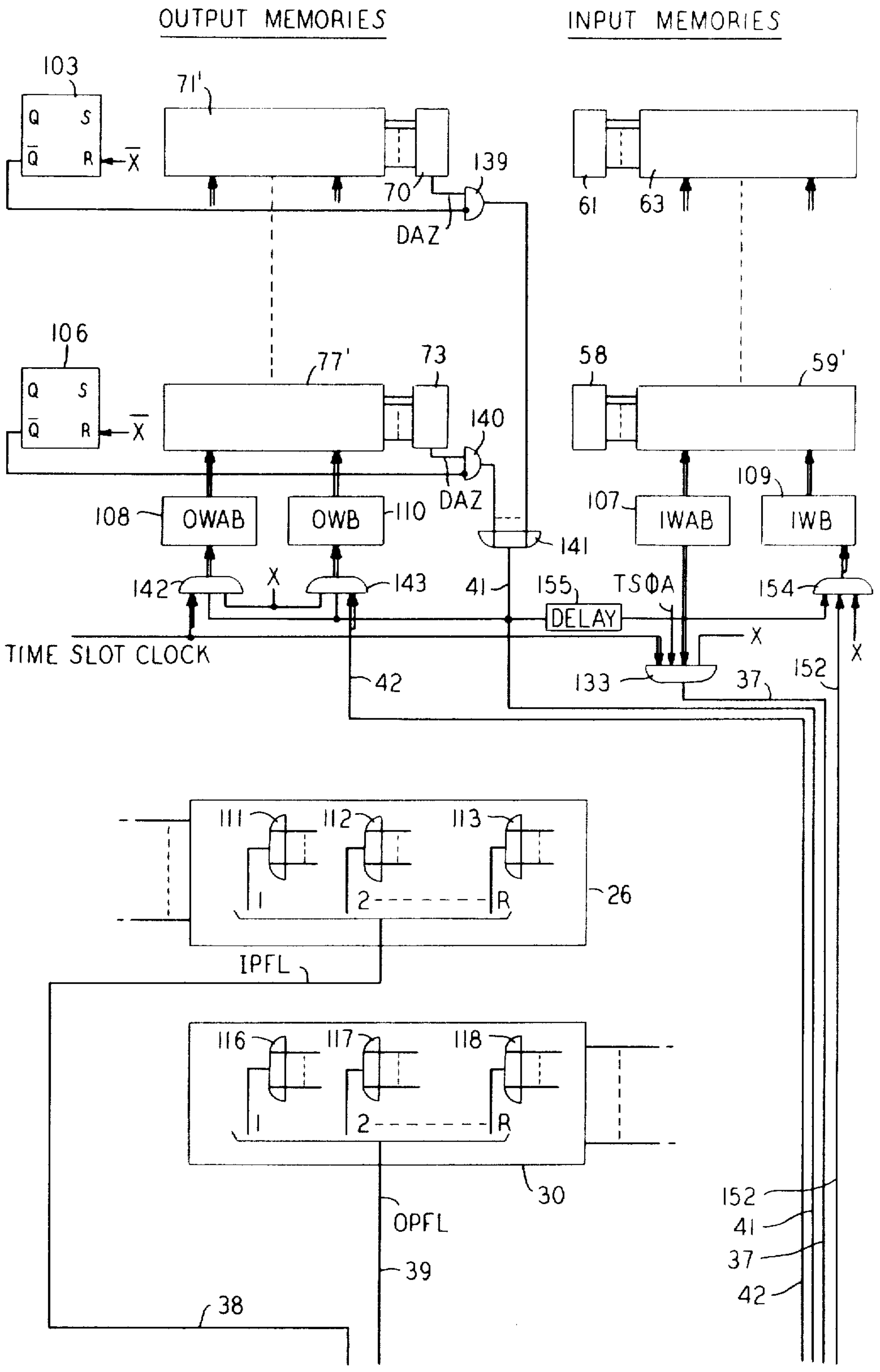
FIGS. 6 and 7 when assembled as shown in FIG. 8 comprise a simplified diagram of selected details of the system in FIG. 2 and illustrating a connect search portion of the pathfinding logic.
Figure 7:
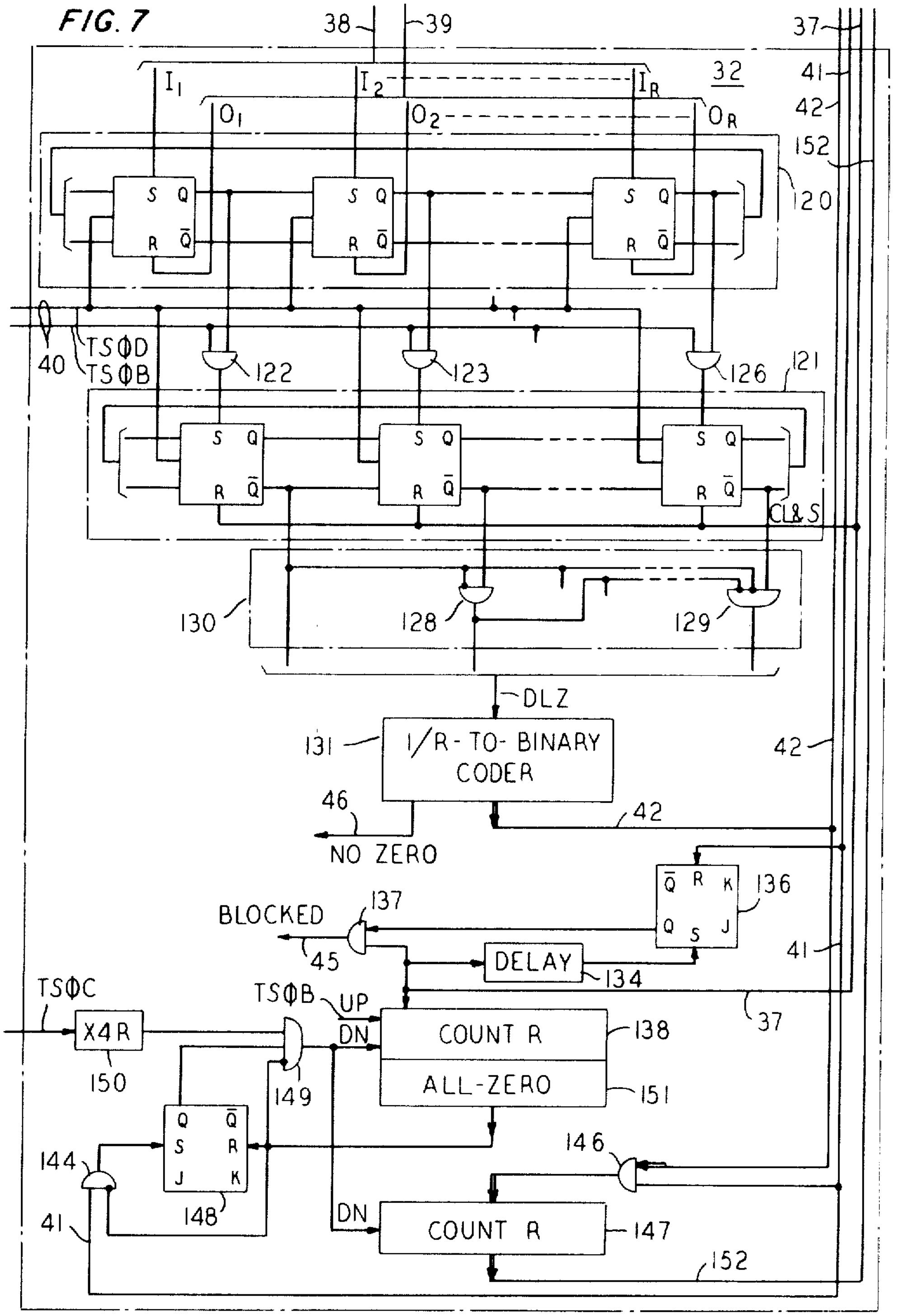
Figure 8:
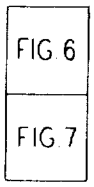

FIGS. 6 and 7, when combined as illustrated in FIG. 8, comprise a simplified diagram of the time division switching office 13 in conjunction with circuit detail of one embodiment of pathfinding logic 32. In FIG. 6 the input and output control memories and associated decoders are illustrated in somewhat the same relationship as they had been previously shown in FIG. 5 with input memories on the right and output memories on the left. It is shown in my aforementioned application that the control memories include certain interface logic such as a line select flip-flop for each control memory and a different set of write and write address buffers for input memories and output memories. This much of the interface logic is separately shown in FIG. 6 and in some other figures to facilitate consideration of the way in which the pathfinding logic is employed. The two buffer registers for a set of input or output memories provide digit and word drive signals for the memory enabled for writing by the setting of its line select flip-flop. Writing takes place in time slot phases C and A for input and output control memories, respectively, so that there is no interference with normal readout operations. In FIG. 6 the output line select flip-flop circuits, such as circuits 103 and 106, are associated with output control memories 71' and 77'. Input and output write address buffers 107 and 108 serve input and output control memories, respectively; but full connections are indicated for buffer outputs to only the control memories 59' and 77', respectively. In like manner input and output write buffers 109 and 110 for input and output control memories have fully shown their connections to only control memories 59' and 77'.

In the systems described in the present application some operations are carried out in bit parallel fashion, and if all of the circuits and gates for those operations were shown, the drawing would become tedious and complicated. Accordingly, a further schematic notation is employed wherein some circuits used for bit parallel operations are distinguished from those used in bit series operations by indicating the former by a double-shaft arrow included in series in the circuit path. Thus for example in FIG. 6, the output write address buffer 108 and the output write buffer 110 are coupled by bit parallel circuits so represented to their associated control memory 77'. This type of notation is employed throughout the drawing where it is useful to distinguish between bit series and bit parallel operations. Not all bit parallel operations are so indicated when it is obvious from the description that such an operation is involved.

It was previously shown that the switching units 26 and 30 of FIG. 2 produce input pathfinding logic signals IPFL__and output pathfinding logic signals OPFL__as shown in FIG. 5 to indicate control signal states in the switching units, respectively. Thus, in FIG. 6 OR gates 111, 112, and 113 collect all of the IPFL__control signals for the cross-point gates of the respective R columns of the input switching unit cross-point matrix. Outputs from these OR gates are separately applied by an IPFL cable 38 to the pathfinding logic 32 in FIG. 7. In similar fashion OR gates 116, 117, and 118 collect cross-point gate control signals for cross-points in the respective R columns of output switching unit 30 cross-point matrix. Outputs of OR gates 116 through 118 are separately applied by an OPFL cable 39 to the pathfinding logic 32. Circuits in cables 38 and 39 are separately represented in FIG. 7 as I1, I2...IR and O1, O2...OR and are utilized for controlling the states of respective stages of a reentrant shift 120 which is the same type and size as the register 28' in FIG. 5. Information contained in shift register 120 is shifted at the time slot rate during time slot phase D by signals applied to logic circuits 32 by way of a lead in the circuit 40. A further reentrant shift register 121 is provided for a purpose to be described and is also of the same type and size as register 28' and is stepped during phase D.

It will be seen, therefore, that shift register 120 receives through cables 38 and 39 signals which indicate when corresponding stages of shift register 28' are opened to receive time division message signals during time slot phase A and when such message signals are read out of any stage of shift register 28' during time slot phase C. After a pair of loading and unloading operations, the shift register 120 is stepped during phase D. Consequently, the state of any stage of register 120 may be changed in either of two ways, i.e., in accordance with normal J-K flip-flop circuit operation in the shift register sequence or during either of the mentioned loading or unloading operations. Since register 120 contains control signal status information, it is convenient to call it the status register. If a particular stage of the status register 120 is set during the loading operation that set state is then shifted along register 120 during each time slot phase D until in another stage of register 28' it is read out to cause the latter stage of status register 120 to be reset. These setting and resetting operations in register 120 correspond to the loading and unloading operations in register 28' for a bit of information during a particular call. The state of any stage in register 120 thus indicates the status of a call and is independent of the binary ONE or ZERO nature of the particular time division message information bit which is being delayed in register 28' during that call.

For purposes of the pathfinding logic 32 in FIG. 7, the additional shift register 121 is designated the compare register. The latter register is initially cleared by the clear and start signal on circuit 37 from input switching unit 26 at the beginning of a connect search operation. During time slot phase B, i.e., subsequent to a phase A loading operation but prior to a phase C unloading operation, a group of coincidence gates, such as gates 122, 123, and 126, is enabled by the time slot phase B signal to couple the Q, i.e., binary ONE, outputs of respective stages of status register 120 for setting corresponding stages of compare register 121. There is no coupling from the $\bar{Q}$ outputs of status register 120 to compare register 121, and as a result the latter register is unaffected by the readout of time division message signals from the delay shift register 28' in FIG. 5. Thus, once compare register 121 has been cleared for a particular connect search operation, any stage of the register can be set during any time slot when a corresponding stage of status register 120 is set; and this information is then shifted through the compare register 121 in succeeding time slots with no opportunity to be overwritten. Consequently, at any given time, the signal state of the $\bar{Q}$, or binary ZERO, output leads of stages of compare register 121 indicate which stages of delay register 28' in FIG. 5 are then available to receive new time division message signals and also have not theretofore received any such signals through circuits 33 in FIGS. 1 and 4 since the last clear-and-start signal on circuit 27.

An additional set of coincidence gates, such as gates 128 and 129, comprises a detect-low-ZERO circuit 130 which provides a distinctive output signal for indicating which of the stages in status register 121 contains the leftmost binary ZERO output. A direct output without a gate is provided at the lowest order stage of register 121. Each of the gates 128 through 129 has an enabling input connection from the $\bar{Q}$ output of a corresponding stage of register 121. The direct output from the lowest order stage and the output of each gate is further connected to an inhibiting input connection of each gate associated with a register stage of higher order. No output of circuit 130 produces an output signal unless its associated shift register stage is in the reset state and all lower order stages are in the set state. Restated differently, any stage which is reset enables its own $\bar{Q}$ output and gate in the detect-low-ZERO circuit 130; and, if all lower order stages are in the set state, an enabled gate is actuated to produce an output signal which disables all higher order gates regardless of the states of their corresponding register stages. Thus, the detect-low-ZERO circuit 130 produces a distinctive output signal on only one or its R output circuits. All of those R output circuits are applied to a coder circuit 131 which translates the 1-out-of-R information into binary code format for application to a circuit 42. In the event that no stage of register 121 is in the reset state there is no output from the detect-low-ZERO circuits 130 and coder 131 produces the no-ZERO output on a circuit 46 which is applied to central control 20, as previously described in connection with FIG. 1, to indicate a blocked condition in the office 13. Such a blocked condition results in the production of a busy tone and a STOP command by central control 20.

Operation of pathfinding logic 32 begins when central control detects a subscriber request for call connection service. At that time central control gives the CONNECT SEARCH command and sets the line select flip-flop for the calling line. The input write address buffer, which is for this description assumed to be the buffer 107 in FIG. 6, is loaded from central control 20 with the calling time slot by circuits which are not specifically shown in FIG. 6.

Four control signals of concern to the pathfinding logic 32 are produced as a result of sequencing operations in central control. An X signal initiates a connect search operation to find a connection path, and an $\bar{X}$ signal is available whenever the X signal is absent. A store control signal enables loading into control memories the contents of memory write buffers. Disconnect search operation is initiated by a Y control signal to take down a previously established connections. Finally, a stop signal is available to clear away any of the mentioned control signals except the $\bar{X}$ signal.

The X control signal initiates a connect search operation and cooperates with a time slot phase A signal TS1A to enable a coincidence gate 133 in FIG. 6. This gate compares the binary coded form of the time slot stored in input write address buffer 107 and the binary coded form of current time slot names as provided from the time slot clock in central control 20. Upon the detection of a time slot match by the gate 133, a gate output signal is produced on circuit 37 and is the clear and start signal previously mentioned.

The clear and start signal clears the compare shift register 121 in FIG. 7 and, after a single time slot delay in a delay circuit 134, sets a block-detecting flip-flop 136. However, no blocking signal is immediately produced because the time delay required for sufficiently establishing the set condition of flip-flop circuit 136 to enable a coincidence gate 137 at the Q output of the flip-flop exceeds the time interval during which the current time slot phase A signal is present at the input to gate 133. Accordingly, gate 137 is not actuated at this time to produce a blocking output signal. However, if a full-frame interval passes without flip-flop circuit 136 being reset, recurrence of the match condition in gate 133 will find the flip-flop circuit already set and will actuate the gate 137 to indicate to the central control that a blocked condition prevails.

Clear and start signals on the circuit 37 are also utilized to initiate operations for computing the length of time-location sequence from the starting time slot identified by actuation of gate 133 so that the free input stage in register 28' for that sequence can be determined. This is done by measuring the time which expires until an available time slot is identified on the time division output line which is utilized by the party being called by the calling party. Coupled with that measurement is a determination of a similarly available stage sequence in delay shift register 28'. One form of circuitry for carrying out such a computation is that which is shown in FIG. 7, and the aforementioned clear and start signal on circuit 37 starts the computation by setting to the all-ONE state a modulo-R counter 138 which can be operated for counting in either direction.

Thereafter, counter 138 is operated to overflow from its set state in response to the next time slot phase B pulse provided from central control 20. An all-ZERO detector 151 is immediately actuated and resets a flip-flop 148. While counter 138 is counting up in response to phase B pulses, the detect-low-ZERO circuit 130 is also in operation, and its associated coder 131 is providing output signals on circuit 42 identifying in binary coded form the lowest order stage of compare register 121 which includes a binary ZERO state indicating the end of a free time-location sequence in delay register 28'. While these operations are taking place, the control memories in switching units 26 and 30 are being continuously scanned and outputs of output control memories are being coupled to associated decoders such as the decoders 70 and 73 in FIG. 6. Each output memory decoder includes logic, now shown, for detecting the all-ZERO state; and output from that logic is applied on a DAZ lead to an associated coincidence gate, such as one of the gates 139 and 140, for the corresponding memories. All of such gates, except the gate associated with the called line, are disabled because their respective line-select flip-flops are then in the reset state and apply $\bar{Q}$ outputs to inhibiting input connections of the decoder output all-ZERO gates. However, the line-select flip-flop for the line of the called party will have been set by output signals on circuits, not shown, from central control 20 upon identification of that line in response to called party identification supplied by the calling party.

Thus, on the selected output line the line-select flip-flop is in the set state, and its $\bar{Q}$ output applied to the inhibiting input connection of the associated all-ZERO detecting gate has the effect of enabling that gate. As soon as the control memory of the selected line reads out an all-ZERO word indicating a free time slot, the memory decoder, e.g., decoder 73, actuates the associated gate 140 to produce a first-free-time-slot signal through an OR gate 141 to the circuit 41. This signal on circuit 41 is applied to enable coincidence gates 142 and 143 at inputs to output write address buffer 108 and output write buffer 110. At this time the X control signal is also present, and the current time slot name is applied through gate 142 to output write address buffer 108 for actuating a corresponding word location in control memory 77'. Such a memory is the only one that can respond to a writing operation since it is the only one with a line-select flip-flop in the set state for providing a write enable signal. The coincidence of the X control signal and the first-free-time-slot signal on circuit 41 also actuates gate 143 to apply the output of coder 131 on circuit 42 to the output write buffer 110.

Output from coder 131 identifies the lowest order stage of delay register 28' which is, in that first-free-time-slot, available for readout to the time division output line 17 on which that time slot is free. Thus, output control memory 77' has available to it in buffer registers 108 and 110 the time slot and stage name information needed to achieve a coupling to the called party's time division line 17.

Actually, any ZERO outputs of compare register 121 at the time of any free output time slot could be employed to establish a time slot interchange operation. However, the selection of the first free output time slot and the use of the lowest order ZERO stage information from compare register 121 assures operation with the least spread between input and output time slots and packs stage usage toward the low order end of register 28' so that the blocking probability, in the event that longer-than-average delay is needed, is kept as low as possible.

The first-free-time-slot signal on circuit 41 is also utilized to reset the flip-flop circuit 136 in FIG. 7 which is used for detecting a blocking condition. Thus, no blocking indicator can now be produced. That signal on circuit 41 is further employed for actuating a coincidence gate 146 to couple the same output information from coder 131 on circuit 42 into an additional modulo-R reversible counter 147. In addition, the first-free-time-slot signal on circuit 41 is applied through a coincidence gate 144 to set a flip-flop 148 if that gate is not then inhibited by output from all-ZERO detecting circuit 151. The Q, or binary ONE, output of the latter flip-flop enables a coincidence gate 149, if gate 149 is not inhibited by detector 151, to couple the output of a pulse rate multiplier 150 to the down counting input connections of counter 138. Multiplier 150 receives time slot phase C pulses from central control 20, increases their repetition rate by a factor 4R by known techniques, and drives counter 138 down at that rate. Counter 138 can in this way be counted down to its all-ZERO state within a single time slot phase because of the increased rate of counter operation. The time slot phase C pulse which initiated operation of the multiplier 150 thus causes a train of R down-counting pulses to be produced before another time slot phase pulse occurs, and those R pulses are sufficient in number to clear completely the counter 138 regardless of its state.

All-ZERO detector 151 is coupled to counter 138, and when the count therein reaches ZERO the output of the all-ZERO detector 151 resets flip-flop circuit 148 and thereby stops the supply of fast pulses so the down counting is terminated. Counter 147 had been counting down simultaneously with counter 138 but from the binary code representation of the low order stage of delay register 28' which is available for readout to an output time division line. Consequently, when gate 149 is closed to terminate the flow of down-counting pulses, the contents of counter 147 represent the name of the stage in register 28' of FIG. 5 into which a time division message signal bit must be placed in order to be read from that register in the stage indicated by coder 131 in the called time slot identified by the signal appearance on circuit 41. This information in counter 147 is coupled by way of circuit 152 and a coincidence gate 154 to the input write buffer 109 for storage in control memory 59', assuming that memory to be the one associated with the time division line of the calling party. To this end gate 154 is enabled by the X control signal and by the signal from circuit 41 after one time slot phase delay in a delay circuit 155. Thus, buffer 109 is loaded in phase D; and the information can be loaded in memory on the following store control signal.

The time division switching office 13 has now identified the calling and called lines and time slots as well as the names of the stages in delay register 28' where the bits of the corresponding call are to be stored and read out to comprise a time division connection with appropriate time slot interchange between the calling and called parties. The store control signal enables respective control memories 59' and 77' to store the input stage name in memory 59' at the input time slot word location and store the output stage name in output control memory 77' at the output time slot word location. A subsequent stop control signal resets the line-select flip-flops for each of the control memories 59' and 77'. The newly connected call then proceeds in the usual manner with the appropriate time slot interchange until the calling party goes on-hook to initiate a disconnect search operation for taking down the necessary connections.

Figure 9:
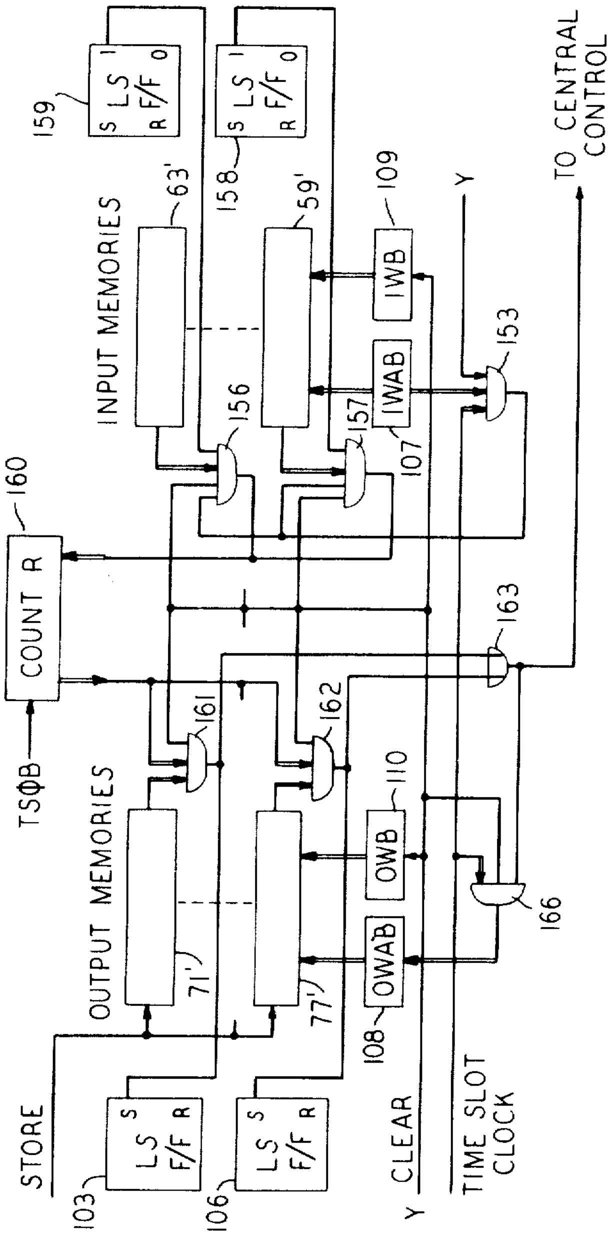
FIG. 9 is a simplified diagram of a portion of the system of FIG. 2 for illustrating the disconnect search portion of one embodiment of the pathfinding logic.

FIG. 9 includes the disconnect search circuits which are included within the pathfinding logic 32 for supervising the operation of the input and output control memories. Once again the control memories are shown in this figure in approximately the same relationship in which they were shown in FIG. 5, and line-select flip-flop circuits for all of the illustrated memories are separately shown in association with their corresponding memories. The new on-hook condition for the calling party in the call to be disconnected is detected in the usual manner by central control 20 which then identifies the calling line and time slot in the usual manner. Central control initiates the disconnect search operation by producing the Y control signal for clearing memory write buffers. Central control also sets the line-select flip-flop, e.g., flip-flop 158, for the calling line control memory. The calling party's time slot is loaded into the input write address buffer 107 for the calling line, and in response to the Y control signal that time slot name is compared with time slot names from the time slot clock by a coincidence gate 153.

Upon the occurrence of a time slot match, the output signal from gate 153 enables additional gates, such as gates 156 and 157. Those gates are connected to receive in binary coded form the digit readouts of the input control memories, such as the memories 59' and 63'. Gates 156 and 157 are also enabled by the Y control signal; and only one of them, e.g., gate 157, is further enabled by the binary ONE output of the line-select flip-flop 158 for the same input line. Line-select flip-flops for all other input control memories, e.g., flip-flop 159, are in the reset state. Thus, the output signal from gate 153 causes the stage name contained in control memory 59' for that same time slot to be coupled by the gate 157 into a modulo-R counter 160 which is driven by the time slot phase B signal to increment the binary-coded representation of that stage name in a binary-counting fashion at the time slot rate.

Outputs from counter 160 are continuously applied to a set of output control memory gates, such as gates 161 and 162. These latter gates are also enabled by the Y control signal and receive further binary-coded stage names from the output control memories as those memories are scanned in the course of usual time division message transmission. When one of the gates 161 or 162 detects a match between the stage names produced from counter 160 and a stage name produced from one of the output control memories, that gate, e.g., gate 162, is actuated. Output signal from gate 162 sets its line-select flip-flop circuit 106. The same output signal is coupled through an OR gate 163 to provide an enabling signal to a further coincidence gate 166. This signal actuates gate 166 to couple the binary-coded name of the time slot which is then current to the input of output write address buffer 108. A store control signal advantageously follows an X signal by a fixed interval, e.g., two frames; but in some other applications central control is informed that the output line and time slot have been identified so that a store control signal can be generated. The store signal enables a writing operation in control memories 59' and 77' so that the all-ZERO contents of the previously cleared write buffers are transferred into the time slot word locations for the input and output time slots, respectively, as indicated by the input and output write address buffers 107 and 108. A subsequent stop signal from central control terminates the connect search operation and the connection for the terminated call is now completely disconnected.

Figure 10A:
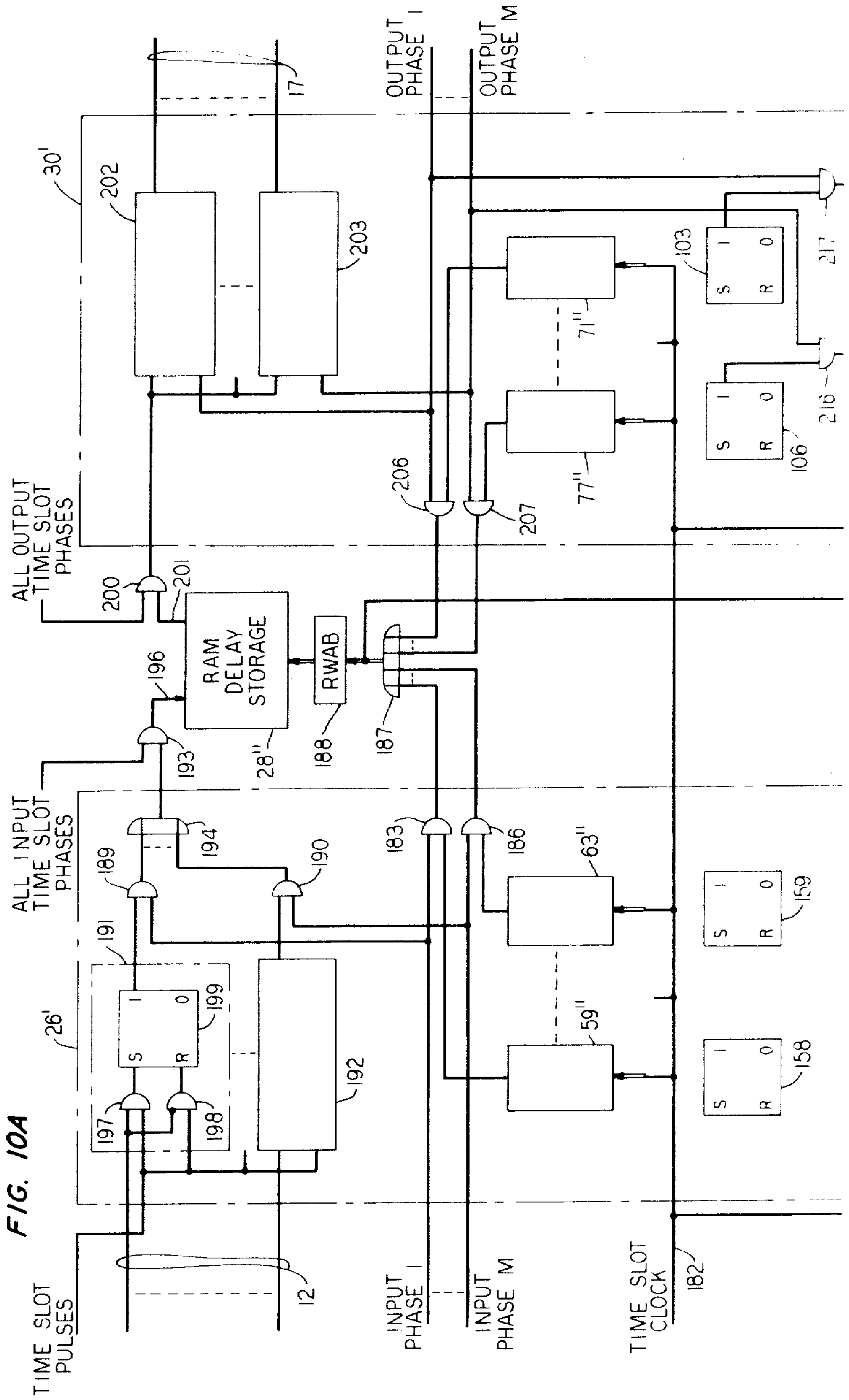
FIGS. 10A, 10B, and 11 are diagrams illustrating a second embodiment of the pathfinding logic of the invention.
Figure 10B:
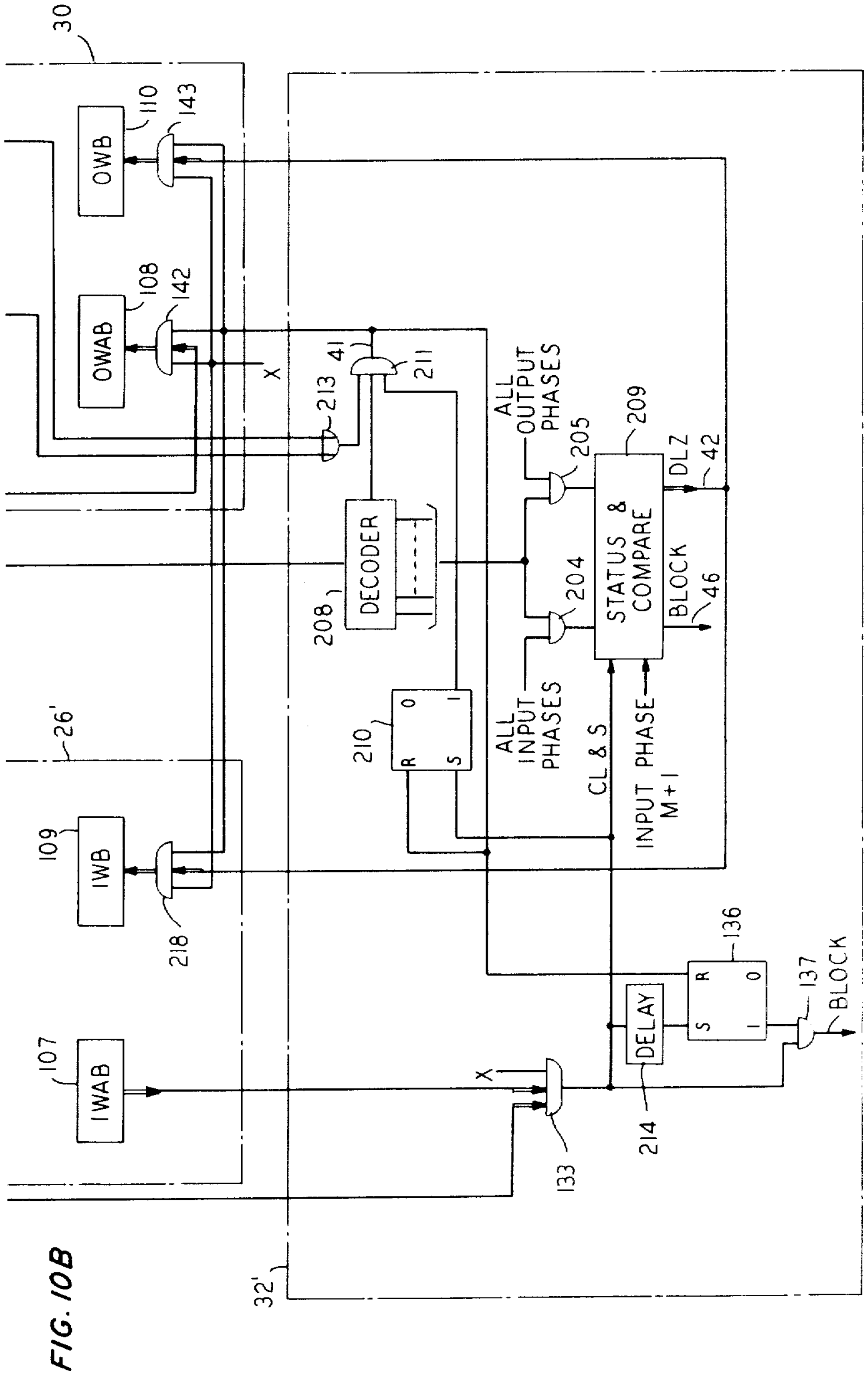

FIGS. 10A and 10B are together a partial simplified diagram of a time slot interchanging embodiment of the invention utilizing a random access memory 28'' for the time slot delay storage 28. This is a static form of delay storage which can be used in lieu of the dynamic form represented by the shift register 28' in FIG. 5. In this embodiment access to the delay storage is gained by scanning the control memories for the input and output time division lines 12 and 17, respectively, once during each time slot to determine which line shall have access to which location in the memory 28'' during each such time slot. Assuming once more for convenience a single-bit time slot interchange operation, memory 28'' is advantageously comprised of an array of individual bistable elements such as the individual flip-flop elements of a semiconductor memory array. In other words, each storage location is a separate entity with no information interchange capability directly provided between the respective storage locations. One double-rail bit circuit provides input information coupling to all of the storage locations and selective access to individual locations is provided by enabling input circuits which may be either individual to the respective locations or which may be on a coincident current access basis. Either form of location enabling access is known in the art and for the purposes of the present description it is assumed that the respective locations are individually accessed by separate input connections, i.e., R enabling input connections for R storage locations.

In a system employing M input time division lines 12 and M output time division lines 17, each time slot is divided into 2M+1 phases rather than the four phases heretofore indicated in connection with FIG. 3. During the first M input phases of each time slot, the input time division lines and corresponding control memories at locations for that time slot are scanned. Corresponding location status information is also provided to pathfinding logic 32' as will be described. In the next time slot phase interval information about the available or free status of locations in memory 28'' is transferred in the pathfinding logic 32' between status and compare registers in an operation corresponding to that previously described in connection with the phase B operations in FIG. 7. Thereafter during the M final, or output, phases of the time slot, the output control memories are scanned in sequence and information units in the locations of memory 28'' indicated by control memory readout are distributed among the output lines. Thus, during each time slot each input line 12 and each output line 17 can have access to any one of the storage locations in memory 28'', and it will be shown that pathfinding logic 32' functions, in a manner similar to that previously described, for determining an available sequence in the time-storage domain for memory 28''.

Switching units 26' and 30' are also provided in FIGS. 10A and B for implementing the scanning coupling mode used there rather than the simultaneous coupling mode employed in FIG. 5. The number of storage locations required in memory 28'' corresponds to the number provided in the shift register 28' in FIG. 5 for the same situation wherein a single-delay storage array is serving multiple time division input lines and multiple time division output lines.

In FIG. 10A the control memories, such as memories 59'', 63'', 77'', and 71'', for the respective time division lines store in different word locations the names of locations in memory 28'' which are to be accessed in a time slot sequence. The writing of this information into those control memories and the reading out of that information is carried on in much the same fashion previously described except that now the readout is utilized for a small fraction of each time slot which is unique for any one memory instead of for a longer fraction of a time slot which is common to a group of memories. Each of the control memories is advantageously a memory in which readout information is available for an interval of controlled duration. One such arrangement might be a magnetic core memory with a buffer readout register; and another, and presently preferred, arrangement is a semiconductor memory wherein the contents of an addressed location are continuously available for as long as the location output is enabled. For convenience of description the latter format is assumed, and time slot clock information is provided in circuits of a cable 182 from the time slot clock source in central control 20. These time slot signals enable, during each respective time slot, a corresponding word location in each of the input and output control memories.

During M input phases of any given time slot, corresponding input time slot phase signals on individual circuits enable coincidence gates such as gates 183 and 186 for sequentially coupling input control memory readout words through a common OR gate 187 and a common read-write address buffer 188 to a common decoder, not separately shown, in memory 28''. That decoder translates the binary coded storage location names into a 1-out-of-R code for accessing the individual memory location which is addressed.

Each input time slot phase signal is also applied to enable a separate time division line coincidence gate, such as gates 189 and 190, for coupling the time division message signal on a respective input time division line 12 through a corresponding one of the line buffer registers, such as register 191 and 192. Output from the line gates is combined in an OR gate 194 for coupling through a clocking coincidence gate 193 which is enabled during each input time slot phase to apply the respective line message signals to an information input connection 196 for memory 28''.

Buffer registers for input and output time division lines are all of the same type, and a schematic diagram is shown in the block representing the input line buffer register 191. Thus, the input time division message signal from a line is converted from single-rail form by a pair of coincidence gates 197 and 198 for application to the set and reset inputs of a flip-flop circuit 199. The time division information signal is applied to a true input connection on gate 197 and a complement, or inhibit, input connection on gate 198. Both of those gates are further enabled at the time slot rate during each complete time slot by a time slot pulse train. Thus, the signal on each time division line is sampled at the time slot rate for the full time slot interval by its line buffer, and the contents of those buffers are respectively sampled in the sequence of input time slot phases for application to input circuit 196 of memory 28''.

If the message signal on circuit 196 during a particular time slot phase is to be stored in memory 28'', an appropriate storage location therein is addressed from the output of the control memory for the line corresponding to that phase. However, if that message signal is to be ignored, no location in memory 28'' will be enabled from the input control memory to receive message signal; and the contents of the memory are thus, during that phase, left totally undisturbed.

In order to extract information from memory 28'' all output time slot phases are applied in sequence to a memory output gate 200 for coupling any memory readout on a readout connection 201 of the memory digit circuit in common to the message input connections of all time division output line buffer registers, such as the registers 202 and 203 in FIG. 10A. These registers are of the same type previously noted in connection with the input switching unit 26' but in this case the clocking input connections of the respective registers are actuated in sequence by the M output time slot phase signals rather than being actuated simultaneously by the time slot pulses. The same M output time slot phase signals enable respective memory output coincidence gates, such as gates 206 and 207, for coupling outputs from respective output control memories through OR gate 187 and read-write address buffer 188 to memory 28''. If during a particular output time slot phase no location of memory 28'' is to be read out, then the word location of the output control memory which is sampled during that phase contains all-ZEROS, i.e., an invalid address, and no memory output signal is applied to output gate 200.

Pathfinding logic 32' in FIG. 10B operates in a fashion which is similar to that previously discussed for the portion of pathfinding logic 32 in FIG. 7. In the case of the logic 32', however, a memory storage location decoder 208 receives continuously control memory output words at the output of OR gate 187 and converts those words from their binary coded form into a 1-out-of-R form in which the location names are coupled to input connections of a status and compare logic circuit 209. Decoder 208 can be the previously mentioned decoder in memory 28'', but it is separately shown in pathfinding logic 32'. The logic circuit 209 includes two sets of bistable circuits corresponding to those of the status register 120 in FIG. 7 and the compare register 121 in FIG. 7, respectively; but in the circuit 209 of FIG. 10 those bistable circuits have no shifting capability within either register.

The status register in circuit 209 simply receives 1-out-of-R signals to set or reset its stages when time division message information is to be read into or out of, respectively, corresponding locations in memory 28''. A gate 204 is enabled during all input time slot phases to couple decoder outputs to setting inputs of the status register and a gate 205 is similarly enabled during output phases to couple decoder outputs to resetting inputs of the status register.

During the M+1 input phase of the time slot phase signals, the binary ONE outputs of the status register bistable circuits are coupled for setting the corresponding bistable circuits of the compare register in the same fashion that a similar status transfer was accomplished during time slot phase B in FIG. 7.

The compare register is cleared at the outset of a pathfinding operation by the clear-and-start signal, the same as in FIG. 7. Throughout the pathfinding operation the binary ZERO outputs of the compare register are examined by detect-low-ZERO logic in circuit 209 as was the case in FIG. 7; and similar output signals are provided to indicate a blocking condition by a signal on circuit 46, or the name of the low order ZERO stage on circuit 42. In the pathfinding logic 32' of FIG. 10B it is not necessary to compute the available input memory location name upon the occurrence of a first free output time slot as was done in FIG. 7 since memory 28'' is a static store and the input and output locations are always the same for any particular message.

In order to establish a time slot interchange connection for a call in FIGS. 10A and 10B, coincidence gate 133 identifies the time slot being used by the input time division line 12 as was done in FIG. 6. Similarly, the output of gate 133 is utilized by the block-detecting flip-flop 136, after one time slot of delay in delay circuit 214, and by the block-indicating coincidence gate 137. The same output also provides the clear and start signal for resetting the compare register in status and compare circuit 209. This time slot match signal from gate 133 is further utilized in FIG. 10B to set a flip-flop circuit 210 which provides at its binary ONE output a signal for enabling a coincidence gate 211. The latter gate also receives on a circuit 212 a further enabling signal each time decoder 208 detects an all-ZERO, or invalid, address word from a control memory. Finally, gate 211 receives an actuating signal from an OR gate 213 which is responsive to the occurrence of a coincidence condition between an output time slot phase signal and a set condition for a line select flip-flop for a corresponding output control memory.

It will be recalled that when a calling party initiates a call and identifies the called party, central control 20 sets the line select flip-flop for the output time division line 17 which serves that called party. Thus, each time the output time slot phase signals look at the output of the control memory, e.g., memory 77'', serving that called party, the binary ONE output signal from the line select flip-flop circuit 106 for that memory actuates a coincidence gate 216 to couple an enabling signal through OR gate 213 to coincidence gate 211. If at that time the circuit 212 indicates an all-ZERO output from the control memory 77'', gate 211 is actuated to signal detection of the first-free-time slot on the called time division line.

The output signal from gate 211 is applied in multiple to coincidence gates 142 and 143 for loading output write address buffer 108 and output write buffer 110. The same enabling signal is also applied to a further coincidence gate 218 for loading input write buffer 109. All three of these gates 142, 143, and 218 are at the same time enabled by the X control signal. Output write address buffer 108 at this time has the current time slot name loaded into it from the cable 182, and the input and output write buffers 109 and 110 have loaded into them the binary coded name of the low order ZERO stage in the compare register of status and compare circuit 209. Finally, the output signal from gate 211 is coupled back to reset the flip-flop circuits 136, for inhibiting a blocking signal, and 210, for removing one enabling signal from the gate 211.

Next central control 20 causes the store control signal to be applied to the control memories for the calling and called lines to have loaded therein the contents of the input and output write buffers 109 and 110, respectively. At the same time the calling and called time slots are provided from the input and output write address buffers 107 and 108 as has been previously described. Thus, the connection for the call through the time slot interchanging random access memory 28'' is established and the pathfinding logic 32' is restored to its available condition for awaiting a new command from central control.

Figure 11:
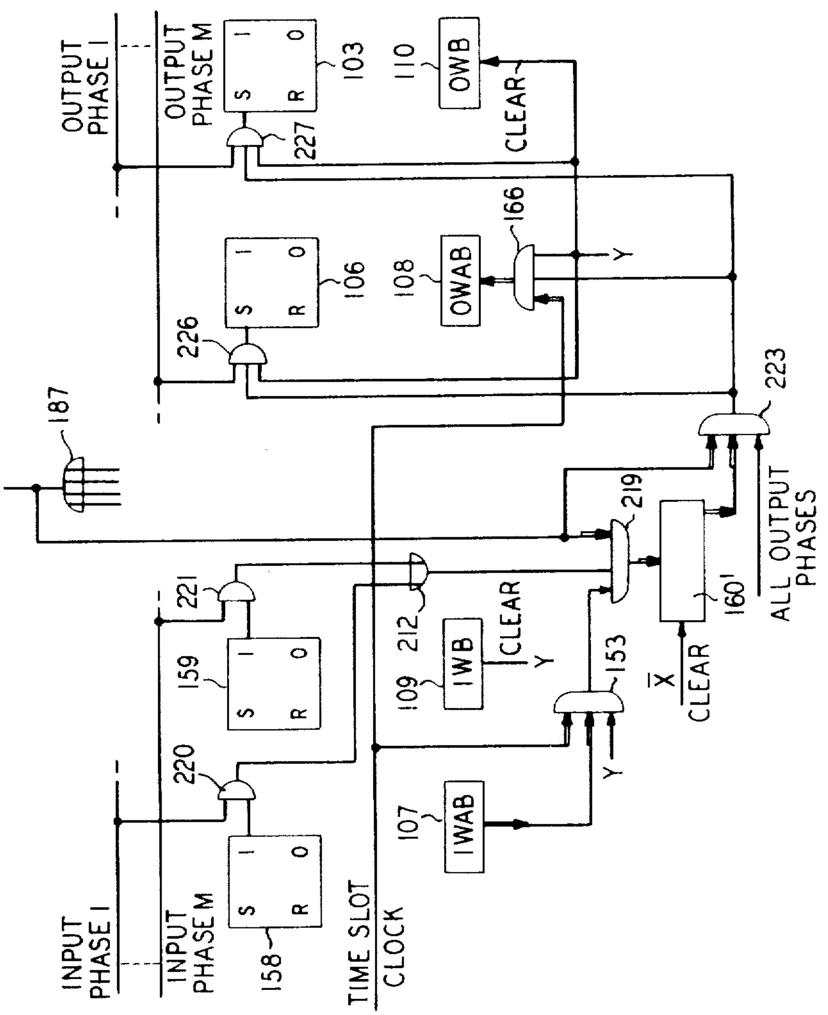

The circuits of FIG. 11 illustrate the disconnect search operation of pathfinding logic 32'. Here again circuit elements corresponding to those employed in other figures are designated by the same or similar reference characters. The function performed in FIG. 11 is similar to that performed in FIG. 9 but modified to accommodate the scanning type of operation for the system in FIG. 10.

Upon the issuance of the Y control signal the input and output write buffers 109 and 110 are cleared. Control memory readout words from the output of OR gate 187 are applied to a coincidence gate 219 which is further enabled by the output of time slot signal matching gate 153. Since the line select flip-flop for the calling party's line is in the set state during the Y control signal, its binary ONE output is applied to a coincidence gate in conjunction with the input time slot phase signal for the same line. Thus, in FIG. 12 gates 220 and 221 perform such a coincidence function for line select flip-flop circuits 158 and 159. The output of the actuated one of these coincidence gates is coupled through an OR gate 212 to provide a further enabling signal to the gate 219. Thus, upon the occurrence of a time slot match and the input time slot phase for the calling line, gate 219 is actuated to apply the binary-coded readout of the calling line control memory to a register 160' corresponding to the incrementing register 160 of FIG. 9. In this case, however, the register 160' has no shifting capability, and it was cleared by the X control signal of the preceding disconnect search operation.

Subsequently, all output time slot phase signals are applied in sequence to a gate 223 which also receives the output of register 160' and the output of OR gate 187. Upon the occurrence of a match between the outputs of the OR gate and of register 160', the appropriate output location in memory 28'' is identified, and gate 223 is actuated. Output signal from this gate cooperates with the Y control signal for enabling gate 166 to couple the then-current time slot name into the output write address buffer 108. The same signals cooperatively enable input coincidence gates, such as gates 226 and 227, for coupling respective output time slot phase signals for setting corresponding output line select flip-flops such as the flip-flops 103 or 106. During the time slot phase when gate 223 is actuated, the corresponding line select flip-flop which receives the same output time slot phase signal is set. Thereafter, upon the occurrence of a store control signal, the all-ZERO contents of the previously cleared input and output write buffers are stored in the input and output control memories for the calling and called lines, respectively, at the word locations designated by the input and output write address buffers. This takes down the time slot interchange connection for the call, and a subsequent stop control signal terminates the disconnect search operation so that the call connection is completely terminated. At that time the $\bar{X}$ signal once more clears the register 160'.

Having now reviewed the application of principles of the present invention to systems utilizing both dynamic and static time slot delay storage as embodied in the reentrant shift register 28' and the random access memory 28'', it will be apparent to those skilled in the art that other forms of dynamic or static delay storage can also be employed. For example, a delay storage 28 employing static memory in the form of an array of independent bistable circuits with no shifting capacity can be employed. Such an array is similar in some ways to the random access memory, but it is advantageously operable on a simultaneous full-time slot access basis as in the case of the shift register embodiment rather than on a scan basis within a time slot as was used in the random access memory embodiments. Circuits are not specifically illustrated for the full-time slot access static register form of the invention since they are essentially similar to those provided for the reentrant shift register embodiment with the omission of shifting input drive for the storage 28 and for the pathfinding logic 32 and the omission of interconnections between bistable circuits of any particular register in storage 28 and logic 32.

Figure 12A:
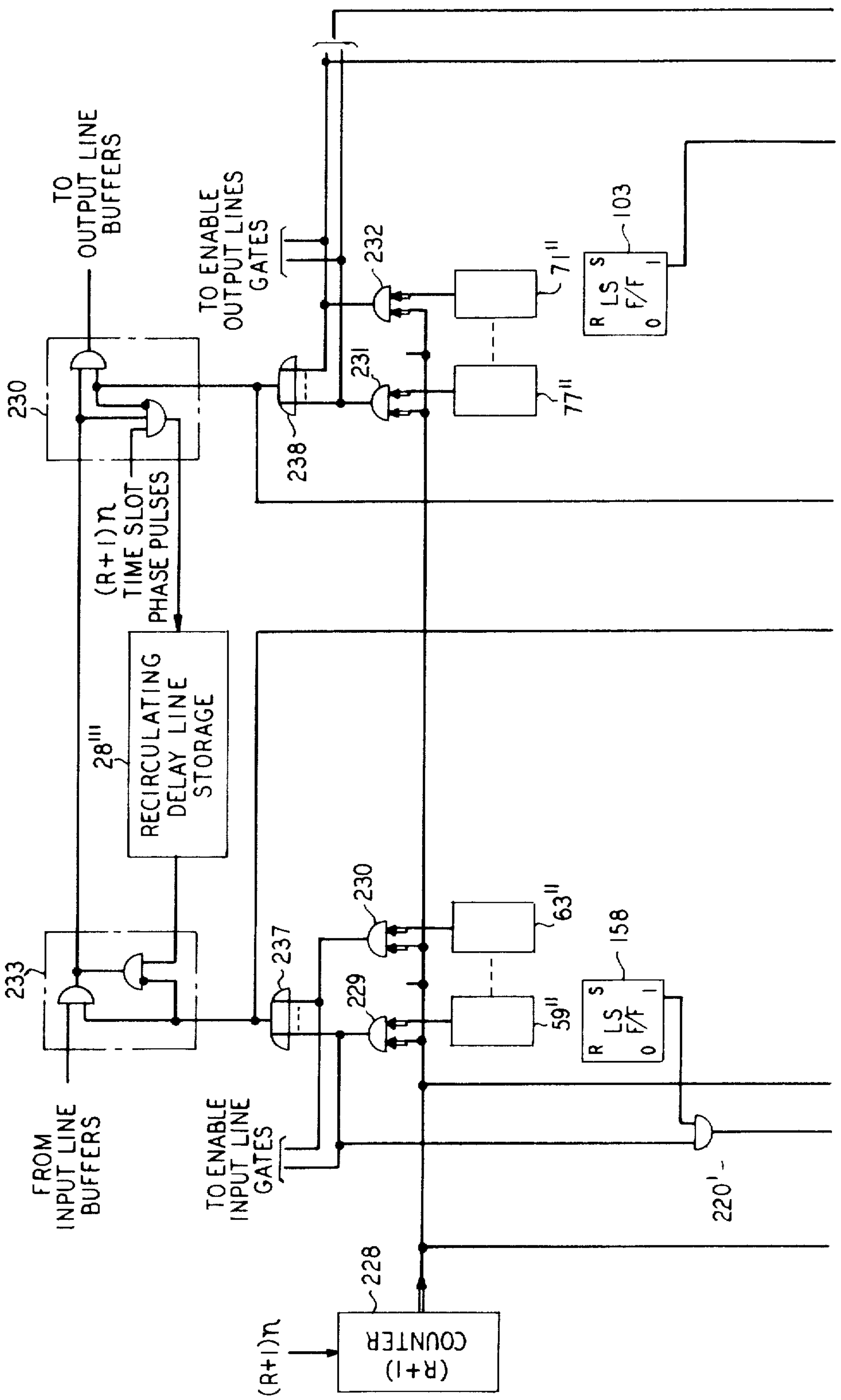
FIGS. 12A, and 12B are together a simplified partial diagram illustrating a further embodiment of the invention.
Figure 12B:
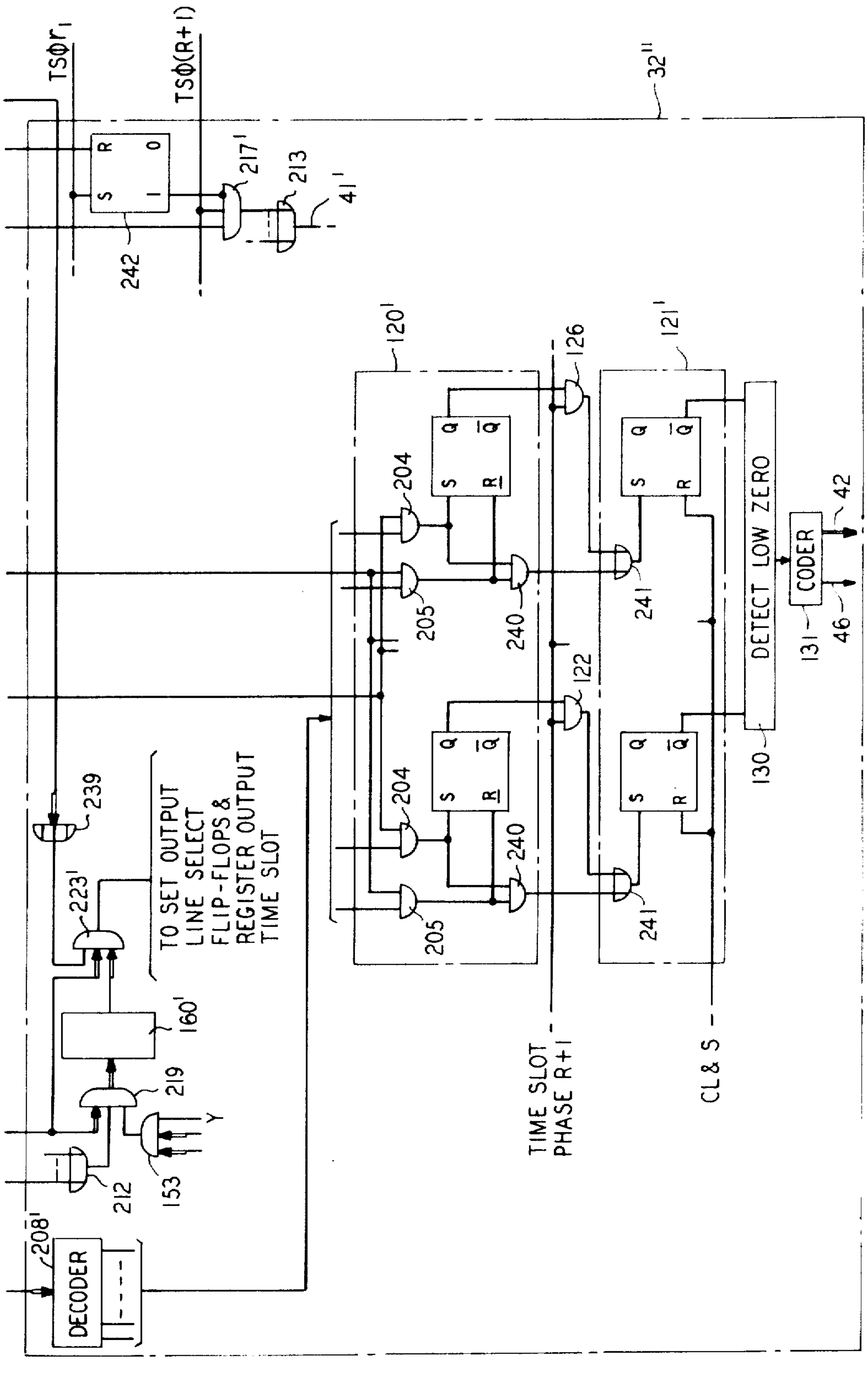

FIGS. 12A and 12B are a partial diagram of another alternative form of storage utilizing the time slot scan access technique. Many portions that are the same as or similar to portions in other embodiments have been omitted. This embodiment is one wherein the delay storage 28 utilizes a delay line 28''' having a number of storage locations corresponding to the number employed in either the reentrant shift register or the random access memory. This is a form of dynamic storage, and the locations in their fixed sequence are recirculated through the delay line in response to delay line drive signals occurring at the rate of (R+1)$n$ pulses where R+1 is the number of storage locations in the delay line and $n$ is the number of time slots per frame of time division signal transmission. Only R of the locations are used for storage as will be later described in detail. The delay line embodiment is similar to the random access memory embodiment since both are operated in the scanning mode. Delay storage locations are accessed in their sequential position in the delay line 28'''.

Individual control memories are provided for the respective time division lines in the delay line embodiment, and word locations in each control memory are scanned at the time slot rate as in the previously described embodiments. Within each store a name of a delay line storage location to be used for the corresponding time division line in the particular time slot is stored in the time slot word location. However, in a delay line embodiment of R+1 storage locations a modulo−(R+1)$n$ rate. The binary code representation state of the counter outputs in each scan interval is compared to the binary output from each input and output control memory by coincidence gates such as gates 229–232. Upon the detection of a match, it is known that the delay storage location corresponding to the modulo−(R+1) counter state is then at the delay line input and output points and is to be accessed by the time division line corresponding to the control memory for which the match occurs. Accordingly, the line gate of that line is actuated, and an input control gate 233 to the delay line is opened to receive time division message information of time slot unit magnitude from the line buffer for that line if the match occurred at an input control memory. If the match occurred at an output control memory, then a corresponding output line buffer is enabled, and a delay line output gate 236 is opened to apply the contents of the corresponding delay line location to the line buffer for that output time division line. Gates 233 and 236 comprise known combinations of coincidence gates for allowing access to information in a circulating delay line, and the gates are opened and closed by control memory output match signals. Input and output lines have simultaneous time slot access to the delay storage, but on a scanning basis, at a rate somewhat higher than in the random access memory embodiment because R+1 is usually larger than 2M+1.

Pathfinding logic 32'' for the delay line embodiment is similar in many respects to that already described for the random access memory embodiment, but it operates at a somewhat faster rate than does the latter embodiment. In the pathfinding logic the outputs of the modulo−(R+1) counter are decoded to a 1-out-of−(R+1) basis by decoder 208' and utilized for coupling control memory match output signals from OR gates 237 and 238 to corresponding stages of the status register 120' in a status and compare logic 209. Match signals from input control memories are utilized by way of coincidence gates 204 to set such stages to which they are steered, and match signals from output control memories are utilized by way of coincidence gates 205 to reset those stages.

The stages of status register 120' are bistable circuits of the dominant reset type and are not interconnected for shifting. Such bistable circuits have input connections designed to respond to separate set or reset input signals in the usual manner but to hold or assume the reset state if driven simultaneously by set and reset input signals. In the event of such coincidence in a stage of the register 120', the corresponding one of coincidence gates 240 is actuated to apply a signal through an OR gate 241 to set a corresponding bistable circuit stage of compare register 121'. The stages of the latter register are conventional bistable circuits with no shift capability and are simultaneously reset by the clear and start signal.

Information is transferred from the status register to the compare register at the time slot rate during time slot phase R+1 after all of the first R locations of delay line 28''' have been scanned. Such transfer sets any stages of compare register 121' corresponding to set stages of status register 120'.

A free output time slot is located in FIGS. 12A and 12B in a somewhat different manner than in other embodiments. A set of flip-flops, including the single illustrated flip-flop 242, is associated with respective output control memories. All of the flip-flops 242 are set in the initial phase TS0$r_1$ of each time slot; and in that same phase and subsequent phases the respective flip-flops 242 are reset anytime the match gate, e.g., gate 232, of the corresponding control memory is actuated. For each output control memory the binary ONE outputs of its line select flip-flop, e.g., flip-flop 103 for memory 71'', and of its additional flip-flop 242 are applied to coincidence gate 217' for the memory. The gates 217' are enabled in the final phase TS0(R+1) of each time slot, and the output of any activated gate 217' is applied through OR gate 213 to circuit 41' because such gate represents the selected output line and shows that the line had no memory output match in the time slot. Otherwise the connect search function for the pathfinding logic operates substantially the same as that described for the random access memory embodiment of FIG. 10.

During a disconnect search operation in a delay line embodiment, the pathfinding logic also operates in a manner similar to that already described for the random access memory embodiment. Thus, a match between the calling line time slot and the time slot clock at gate 153 is determined; and upon coincidence at gate 219 of that condition with actuation of an (R+1)−count match gate, e.g., 229, at the output of the calling line control memory 59'', the contents of the R counter 228 are loaded into register 160'. That register has no incrementing function. Match gate outputs from lines having the line select flip-flop set ate the only ones used at gate 219 as determined, for example, for memory 59'' by coincidence gate 220' which has its output coupled through OR gate 212 to gate 219. This initial information loaded into the register 160' is the name of the delay line storage location which is used for the call to be disconnected, and that information must be employed to identify the output time division line and time slot. For the latter purpose, each time the modulo−(R+1) counter 228 goes through the state corresponding to the contents of register 160', gate 223' looks at the output of an OR gate 239 for output control memory match signals to find one, e.g., from memory 71'', which has its (R+1)−match gate actuated. Upon occurrence of such a match, the output of gate 223' is used in coincidence with the (R+1)−match gate output of such memory to set the line select flip-flop for that output control memory in the same fashion that time slot phase signals were used in coincidence with gate 223 output in FIG. 11. Thereafter the then-current time slot name is registered in the output write address buffer. Upon the occurrence of the next store control signal the previously cleared contents of the input and output write buffers are stored in the selected control memories at the time slot word locations identified at the input and output write address buffers.

Although the present invention has been described in connection with particular embodiments thereof, it is to be understood that additional embodiments, modifications, and applications of the invention, which will be obvious to those skilled in the art, are included within the spirit and scope of this invention.

What is claimed is:

1. In combination, multiple information signal storage locations, a first set of input connections and a second set of input connections to said storage locations for supplying corresponding sets of control signals, said signals in either set having a pattern of signal permutations and combinations which is variable from one time interval to another within a recurrent sequence of intervals of predetermined number, where said pattern is capable of being repeated over plural sequences of successive time intervals, means for storing and reading information signals in said storage locations in response to said first and second sets control signals, means for establishing a signal representation of a first one of said intervals, which first interval is associated with one of said first set connections, means, responsive to said first interval representation, for determining a second one of said intervals associated with one of said second set connections and that is either the same as said first interval or is a different interval, and means for identifying a time-location sequence in the time-storage domain for said storage locations, said time-location sequence including at termini thereof said first and second intervals and having a uniform storage location occupancy status throughout such sequence.

2. The combination in accordance with claim 1 in which said locations are bistable elements, each having a set state and a reset state, and said first and second sets of connections apply said first and second sets of signals, respectively, for enabling storing and reading, respectively, in said bistable elements.

3. The combination in accordance with claim 1 in which said multiple information signal storage locations comprise respective stages of a reentrant shift register.

4. The combination in accordance with claim 1 in which said multiple signal storage locations comprise respective locations of a random access memory.

5. The combination in accordance with claim 1 in which said multiple signal storage locations comprise respective locations of a recirculating delay line.

6. The combination in accordance with claim 1 in which said identifying means comprises means for identifying a time-location sequence including no signal-free locations, and wherein every location of the last-mentioned sequence has the same signal stored therein throughout any given occurrence of said signal-free sequence.

7. The combination in accordance with claim 1 in which said identifying means comprises means for identifying a time-location sequence including no signal-occupied locations.

8. The combination in accordance with claim 7 further comprising termini identifying means including means for identifying a time-location sequence including no signal-free locations, and every location of the last-mentioned sequence has the same signal stored therein throughout any given occurrence of said signal-free sequence.

9. The combination in accordance with claim 1 in which said identifying means comprises first register means for registering changes in storage status of said signal storage locations, second register means for registering, for respective ones of said storage locations, continuation of a predetermined one of its occupancy status states without interruption through a succession of said intervals, and means for periodically transferring indications of said predetermined states from said first register means to said second register means.

10. The combination in accordance with claim 9 further comprising means for providing time base signals, and means responsive to said control signals and signals for time base controlling the state of said first register means in each of said intervals.

11. The combination in accordance with claim 9 in which said first and second registers are reentrant shift registers.

12. The combination in accordance with claim 9 in which said first and second registers are static registers, each having one stage corresponding to a different one of said storage locations.

13. The combination in accordance with claim 9 further comprising means for providing time base signals which divide each of said intervals into at least one input phase and at least one output phase, means for actuating said storing and reading means during said input and output phases, respectively, in response to said time base signals, and means for actuating said transferring means between said input and output phases.

14. The combination in accordance with claim 9 further comprising means for providing time base signals dividing each of said intervals into at least one input phase and at least one output phase, means for actuating said storing and reading means during said input and output phases, respectively, in response to said time base signals, and means for actuating the transferring means at the end of each of said intervals.

15. The combination in accordance with claim 9 further comprising means, coupled to said second register means, indicating an order name of the lowest order stage thereof standing, in said second interval, in said one predetermined occupancy status, said name also representing the name of the corresponding one of said locations.

16. The combination in accordance with claim 15 further comprising means for registering the name of said low order stage upon occurrence of said second interval.

17. The combination in accordance with claim 15 in which said identifying means comprises means for computing, in response to said low order location name, the name of the one of said locations in the same time-location sequence which had said predetermined occupancy status in said first interval, and means for registering both said second interval low order location name and said first interval location name.

18. The combination in accordance with claim 17 in which said identifying means comprises means for identifying as said second interval the one of said intervals during which the control signal of a preselected one of said second set connections has a predetermined character, and said computing means comprises reversible counting means for counting in a first direction at the recurrence rate of said intervals during operation of said second interval identifying means, means, responsive to identification of said second interval, for operating said reversible counting means in a second direction at a much faster rate, further counting means, means for transferring said low order stage name to said further counting means in response to identification of said second interval, means for actuating said further counting means simultaneously with said reversible counting means in said second direction at said faster rate, means for inhibiting operation of said reversible and further counting means in response to attainment of an all-ZERO state in said reversible counting means, and means for registering the contents of said further counting means upon attainment of said all-ZERO state.

19. The combination in accordance with claim 1 further comprising means for supplying trains of binary coded words representing, respectively, names of said intervals in said recurrent sequence, and said identifying means comprises means for identifying as said second interval the one of said intervals during which a control signal for a preselected one of said second set connections has a predetermined character, and means, responsive to identification of said second interval, for registering the one of said binary-coded words which defines the one of said intervals in which said predetermined character occurs.

20. The combination in accordance with claim 19 in which said means for determining said second interval comprises a separate bistable circuit associated with each of said connections of said second set, means for setting all of said bistable circuits at the outset of each of said intervals, means for resetting respective ones of said bistable circuits in response to said predetermined character of the control signal on the one of said second set connections with which such bistable circuit is associated, and means, responsive to a set state of the one of said bistable circuits associated with said preselected connection at the end of an interval, for registering one of said binary-coded words to indicate the one of said intervals in which said control signal status occurred.

21. The combination in accordance with claim 19 in which said means for determining said second interval comprises means for supplying a different time base phase signal in each of said intervals for enabling each of said connections of said second set, and means, responsive to occurrence of said predetermined character on said preselected second set connection during said phase for such connection, for registering one of said binary-coded words to indicate the one of said intervals during which said character occurred.

22. The combination in accordance with claim 1 in which said determining means comprises means for registering in said first interval a control signal for a preselected one of said first set connections, means for detecting, on one of said second set connections, a control signal corresponding to the signal in said registering means for the same time-location sequence, and means for registering as said second interval the one of said intervals said corresponding signal is identified.

23. The combination in accordance with claim 1 in which said determining means comprises means, responsive during said first interval, for registering said control signal from a preselected one of said first set connections, means for comparing the output of the control signal registering means with control signals from connections of said second set, means, responsive to the detection of a match condition in said comparing means, for marking the one of said second set connections on which the match occurred, and means, responsive to such match condition, for registering the name of the one of said intervals in which such match condition occurred as said second interval.

24. The combination in accordance with claim 23 in which said means for registering said first set connection control signal comprises a modulo—R counter, where R is the number of said locations, and means for incrementing said counter in each of said intervals.

25. The combination in accordance with claim 23 further comprising means for limiting operation of said comparing means to time phases of each of said intervals in which said second set control signals are present.

26. The combination in accordance with claim 23 in which said comparing means comprises a modulo—(R+1) counter, where R+1 is the number of said locations, means for matching outputs of said counter against said second set control signals and for providing an output signal upon the occurrence of a match, and means, responsive to the output signal of said matching means for actuating said means for registering the name of said second interval.

* * * * *